United States Patent [19]

Hagenah

[11] Patent Number: 5,224,792
[45] Date of Patent: Jul. 6, 1993

[54] SHAPED (CONCRETE) SLAB KIT

[75] Inventor: Gerhard Hagenah, Worpswede, Fed. Rep. of Germany

[73] Assignee: SF-Vollverbundstein Kooperation GmbH, Fed. Rep. of Germany

[21] Appl. No.: 455,012

[22] Filed: Dec. 22, 1989

[30] Foreign Application Priority Data

Jan. 5, 1989 [DE] Fed. Rep. of Germany ... 8900109[U]
Feb. 18, 1989 [DE] Fed. Rep. of Germany ... 8901920[U]

[51] Int. Cl.⁵ .............................................. E01C 5/00
[52] U.S. Cl. ..................................... 404/39; 404/41; 52/603; 52/604
[58] Field of Search ............... 404/17, 18, 29, 37–42, 404/45, 47, 49, 50; 52/603, 604, 590, 589, 580, 600

[56] References Cited

U.S. PATENT DOCUMENTS

| 1,058,674 | 4/1913 | Kertes | 404/38 |
| 1,364,236 | 1/1921 | Bichan et al. | 404/38 |
| 1,384,042 | 7/1921 | Brotsch | 404/38 |
| 2,095,012 | 10/1937 | Renkert | 404/38 |
| 2,210,150 | 8/1940 | Notari | 404/38 |
| 2,368,330 | 1/1945 | Schwartz | 404/18 |
| 3,421,417 | 1/1969 | Pilaar | 404/37 |
| 3,557,669 | 1/1971 | Fenton | 404/42 |
| 4,185,939 | 1/1980 | Barth et al. | 404/38 |
| 4,370,075 | 1/1983 | Seales | 404/41 |
| 4,496,266 | 1/1985 | Ruckstuhl | 404/38 |
| 4,571,353 | 2/1986 | Gable, Jr. | 404/41 |
| 4,850,739 | 7/1989 | Gargollo | 404/41 |

FOREIGN PATENT DOCUMENTS

| 502451 | 7/1978 | Australia |  |
| 6098386 | 3/1987 | Australia |  |
| 2519225 | 11/1976 | Fed. Rep. of Germany |  |
| 2743317 | 5/1979 | Fed. Rep. of Germany |  |
| 3145980 | 6/1983 | Fed. Rep. of Germany |  |
| 3300098 | 8/1983 | Fed. Rep. of Germany |  |
| 3303225 | 8/1984 | Fed. Rep. of Germany |  |
| 8705004 | 7/1987 | Fed. Rep. of Germany |  |
| 3641373 | 6/1988 | Fed. Rep. of Germany | 404/37 |
| 3703368 | 8/1988 | Fed. Rep. of Germany |  |
| 8809820 | 11/1988 | Fed. Rep. of Germany |  |
| 2551783 | 11/1985 | France |  |
| 6611464 | 2/1967 | Netherlands | 52/589 |
| 2099 | of 1875 | United Kingdom | 404/39 |
| 22303 | of 1900 | United Kingdom | 52/590 |
| 114377 | 6/1920 | United Kingdom | 52/604 |
| 504355 | 4/1939 | United Kingdom | 404/38 |

Primary Examiner—Ramon S. Britts
Assistant Examiner—Roger J. Schoeppel
Attorney, Agent, or Firm—Sughrue, Mion, Zinn, Macpeak & Seas

[57] ABSTRACT

Shaped slabs (10) made of concrete for forming groundcoverings have spacers (15 to 20) on their edges with which the shaped slabs are braced against one another when the groundcovering is completed. This bracing of the shaped slabs (10) on their spacers (15 to 20) determines the permissible traffic weights such a groundcovering may carry. This means that different shaped slabs have to be provided for groundcoverings which are suitable for heavier traffic weights. The invention is concerned with creating a universal shaped slab (10) which can be used for different traffic weights and therefore suggests shaped slabs (10) the spacers (15 to 20) of which being arranged on the side faces (11 to 14) of said shaped slabs (10) such that depending on the relative positioning of the side faces (11 to 14) when laying the shaped slabs (10), said spacers (15 to 20) are either interlocking or abutting. This way, wide or narrow joints can alternatively be formed between adjacent shaped slabs (10).

32 Claims, 16 Drawing Sheets

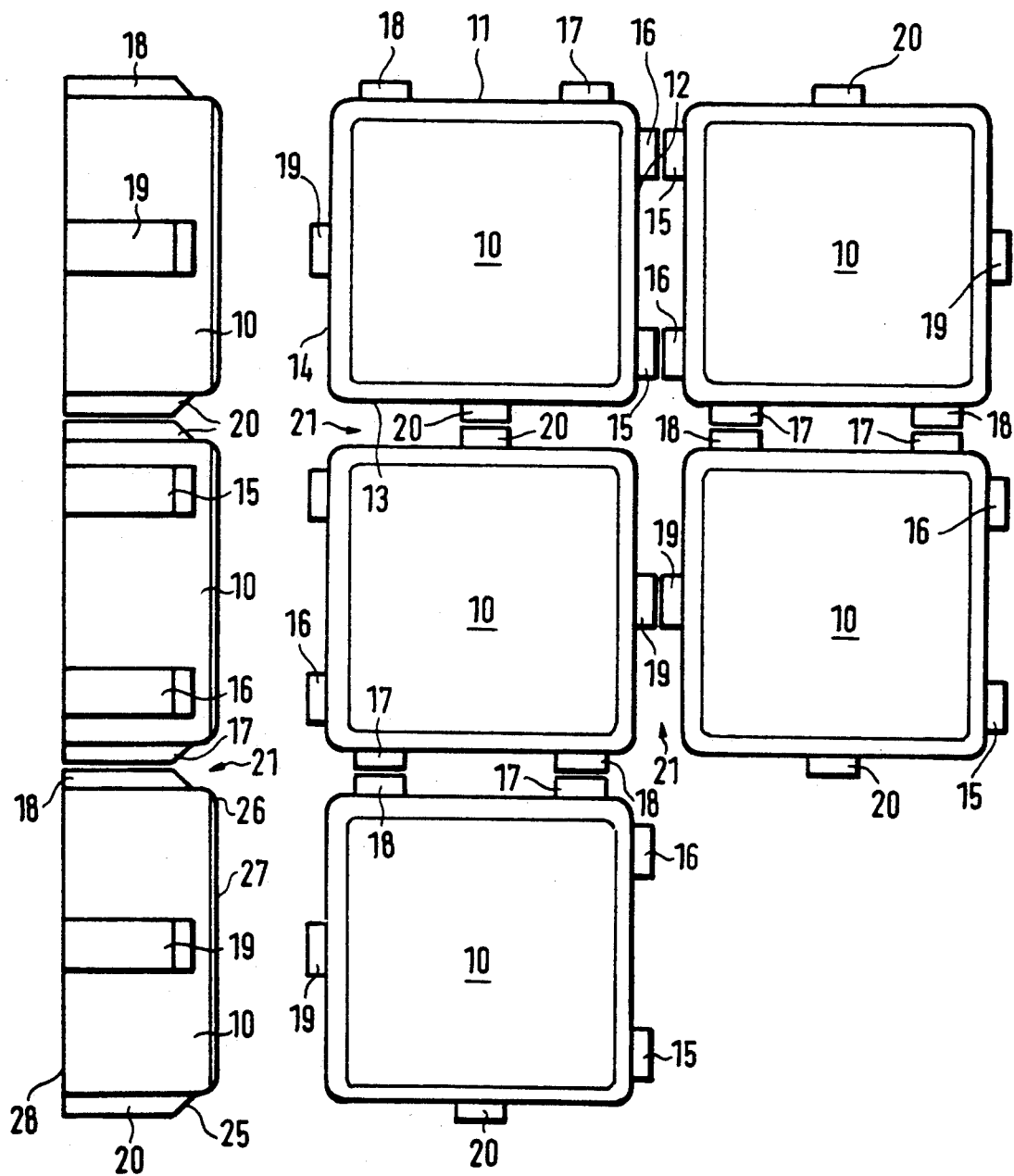

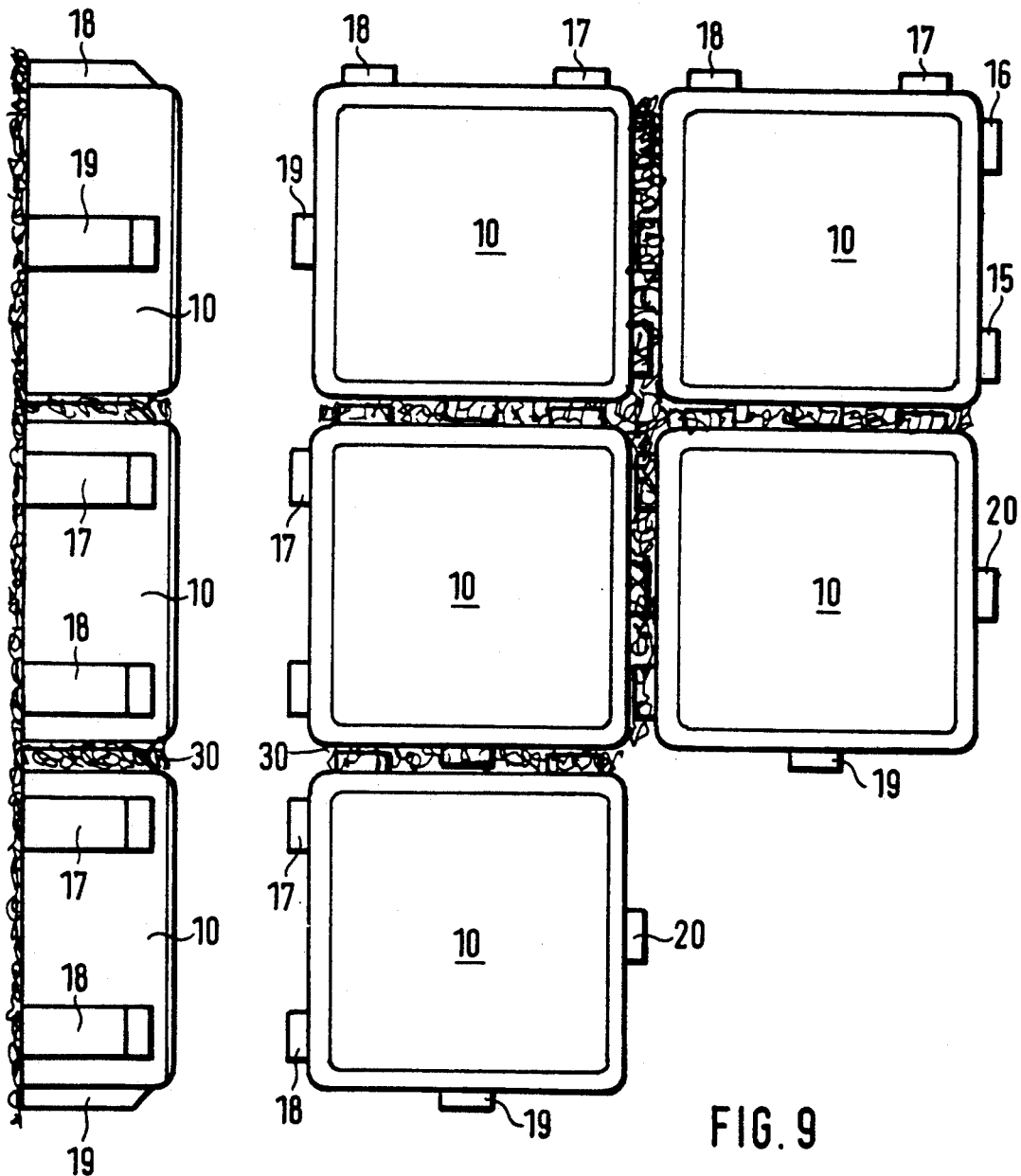

5,224,792

SHAPED (CONCRETE) SLAB KIT

BACKGROUND OF THE INVENTION

The invention relates to a kit of rectangular- or square-formed shaped slabs for making groundcoverings, said shaped slabs having spacers on their side faces.

One known type of the aforementioned shaped concrete slabs has spacers which abut other after the slabs are laid, so that joints are formed between the side faces and have a width twice as big as the thickness of said spacers. These joints can be used for growing grass. This type of paving, however, will become unstable if it is exposed to heavier traffic weights.

Shaped concrete slabs with spacers arranged such that narrower joints are formed are also known. Here, the joints can be filled with filter gravel to provide draining joints which serve for draining water. As these paving joints are not as wide as the grass joints, such type of pavement is suitable for being exposed to heavier traffic weights.

It is a disadvantage, if, depending on which type of pavement is desired, different types of shaped slabs have to be produced, stored and transported, thus effecting considerably higher costs. Furthermore, it is often desirable to establish a paving with an overall uniform look which at the same time is formed differently according to different traffic weights.

SUMMARY OF THE INVENTION

The invention has the object to further develop a shaped slab kit of the aforementioned type such that the shaped slabs can be laid with joints of different widths, while facilitating the process of laying the slabs at the same time.

This object is achieved by a kit made up of shaped slabs, whereby different kinds of groundcoverings (pavings) can be formed, with joints of varying widths depending on different exposure to traffic weights, by arranging the shaped slabs in a specific way relative to one another.

When the slabs are laid so that the spacers of all slabs interlock, a joint is formed, its width being approximately defined by the thickness of a (single) spacer, said joint serving as a draining joint or for growing grass or the like. If, however, the shaped slabs are laid so that side faces of "the same kind" are confronting each other, i.e. with the spacers in abutting position, wider joints are formed between the shaped slab side faces, the width of said joints being defined by the double thickness of the spacers. These joints can be used for growing grass.

The number and arrangement of the spacers on the side faces of the shaped slabs can be determined in different ways while considering the principle that by turning the individual shaped slabs by 90 degrees or 180 degrees relative to one another, a continuous paving can be formed, with the spacers either abutting or interlocking. The easiest way is to arrange the spacers symmetrically relative to middle lines bisecting the side faces, with either all spacers lying next to the middle lines or with part of the spacers lying on one or several middle lines. This type of symmetric arrangement of the spacers ensures an even bracing of adjacent shaped slabs on their spacers, which is of particular advantage, when the spacers are in abutting position.

Alternatively it is also possible to particularly arrange the spacers on two side faces asymmetrically relative to the middle lines, with the spacers either still lying on the middle line or lines, or lying completely beyond these middle lines. This way, the spacers are unevenly spread over the completed paving, which can be of particular advantage for achieving special visual effects.

Preferably, two side faces of each paving slab have an even number of spacers, particularly two, while the remaining side faces of the shaped slabs have an odd number of spacers, preferably just one each. The double spacers per side face are expediently arranged symmetrically relative to the respective middle line and are of the same size. The two spacers are preferably arranged in the same manner on each of these two side faces. The other two side faces have a single spacer each which can be arranged with their centers—i.e. also symmetrically—on the respective middle line. The single spacers can also be arranged off-center, either still lying on or lying beyond the middle line in the region between the two spacers of the other side faces. The decisive point is here that the single spacers arranged on opposite side faces of the shaped slabs are directly opposite one another, i.e. they are set off to the same side relative to the respective middle line. In contrast to that, the individual spacers of adjoining side faces, usually being perpendicular, are positioned such that they are either both set towards or both set away from the corner formed by their respective side faces.

Expediently, the spacers have identical dimensions. However, single spacers can be provided with a bigger width than the double spacers.

It is also possible to assign two spacers or just one spacer to each side face, so that such a shaped slab has either altogether eight or altogether four spacers. Eight spacers per slab would add stability to the paving for carrying heavier traffic weights, but the "gaps" left for a possible growing of vegetation would be smaller. Four spacers per slab would form a paving with relatively big gaps in longitudinal direction of the joints for growing a relatively extensive and nearly continuous vegetation.

The spacers are advantageously smaller in height than the shaped slabs, so that after the slabs are layed, only the surfaces of the shaped slab bodies are visible. It is also of advantage if the upper faces of the spacers are bevelled towards the slab side faces, so that after filling in the joints (with sand or humus), a sufficiently deep layer of the filling material is left in the region of the spacers as well.

BRIEF DESCRIPTION OF THE DRAWINGS

Further advantageous embodiments of the invention follow from the sub-claims. Preferred exemplary embodiments of the invention are described in detail below with reference to the drawings which show:

FIG. 3 a diagramatic representation of a slab paving for forming wide (grass) joints, FIG. 4 a side elevation of the arrangement according to FIG. 3, FIGS. 5 and 6 the arrangement according to FIGS. 3 and 4, the joints being filled with grass vegetation, FIG. 7 a top plan view of a slab paving for forming narrow (draining) joints between the slabs, FIG. 8 a side elevation of the arrangement according to FIG. 7, FIGS. 9 and 10 the arrangements according to FIGS. 7 and 8, the joints being filled with filter gravel or crushed stones, FIG. 11 a top plan view of a shaped slab (second exemplary embodiment), FIG. 12 a diagramatic representation of a slab paving for forming wide joints, FIG. 13 a slab paving for forming narrow joints, FIG. 14 a paving arrangement of the shaped slabs alternative to the one in FIG. 12, for forming wide joints, FIG. 15 a top plan view of a shaped slab (third exemplary embodiment), FIG. 16 a diagramatic representation of a slab paving for forming wide joints FIG. 17 a slab paving for forming narrow joints, FIG. 18 a slab paving for forming partly narrow and partly wide joints, FIG. 19 a top plan view of a shaped slab (fourth exemplary embodiment), FIG. 20 a diagramatic representation of a slab paving for forming wide joints.

DETAILED DESCRIPTION OF PREFERRED EMBODIMENTS

Figure 1:
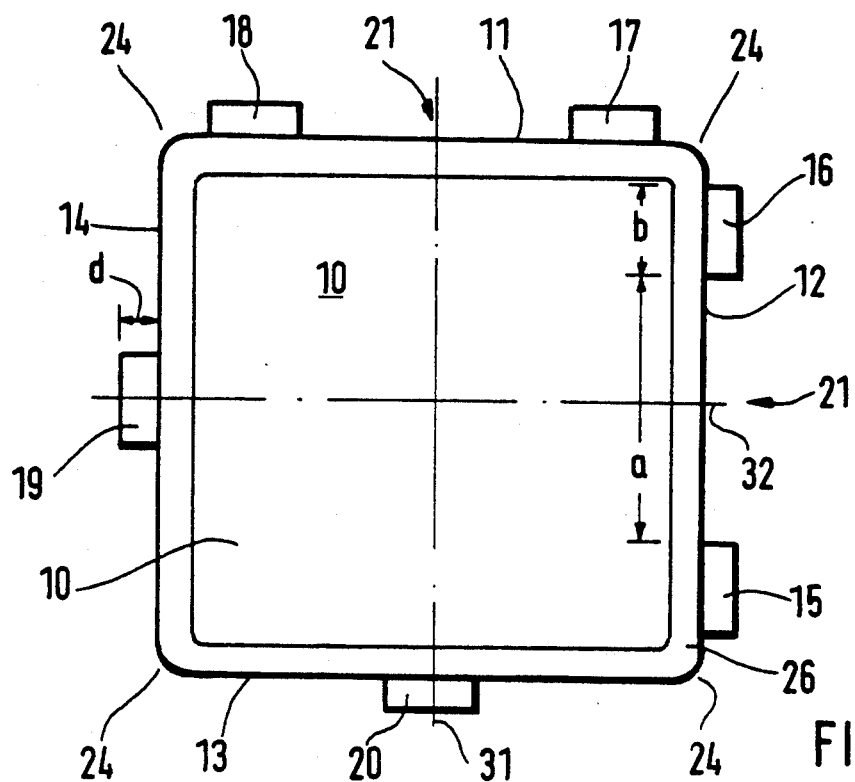
FIG 1 a top plan view of a shaped slab (first exemplary embodiment)
Figure 2:
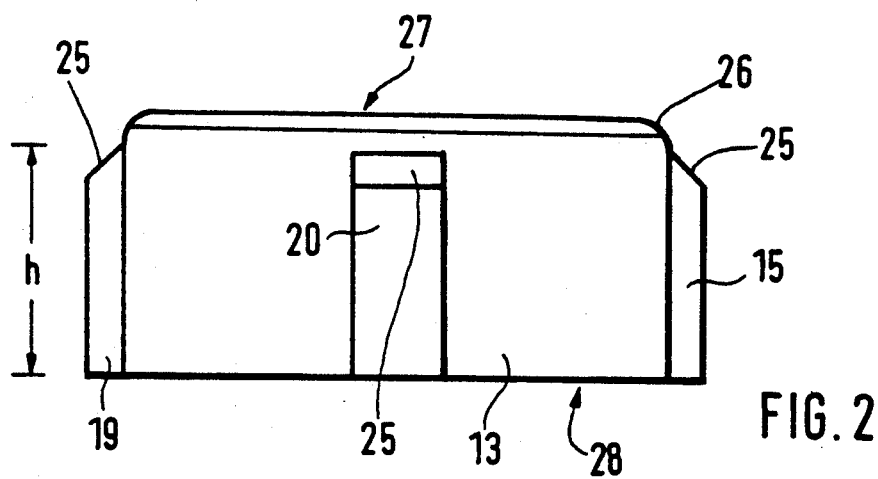
FIG. 2 a side elevation of a shaped slab according to FIG. 1.

The shaped concrete slabs 10, 33, 37, 40, 45 according to the first five exemplary embodiments are of basically square shape, so that longitudinal side faces 11 to 14 of shaped slabs 10, 33, 37, 40, 45 have the same longitudinal length. The distances between corners 24, 26 of said slabs are of equal length too.

Two adjoining side faces 11 and 12 of shaped slab 10 according to the first exemplary embodiment (FIGS. 1 to 10) each have two rib-like spacers 15, 16 and 17, 18 respectively, whereas the side faces 13 and 14 adjoining to said faces 11 and 12 only have one rib-like spacer 19 and 20, respectively, each.

The single spacers 19 and 20 are centrally positioned on side faces 13 and 14, respectively, i.e. said spacers 19 and 20 lie exactly (symmetrically) on middle lines 31, 32 of shaped slab 10, said middle lines bisecting the side faces 13, 14. The spacer pairs 15, 16 and 17, 18 of opposite side faces 11 and 12, respectively, of shaped slab 10 are each positioned close to edges 24 of shaped slab 10. Said spacer pairs 15, 16 and 17, 18 are thus also lying symmetrically on either side of the middle lines 31, 32. The intermediate distances "a" between the spacers in spacer pairs 15, 16 and 17, 18 are in this case bigger than the longitudinal width b of spacers 15 to 20. Thickness d, i.e. the measurement of how far the spacers 15 to 20 jut out from side faces 11 to 14, is chosen to be the same with all spacers 15 to 20.

The end faces of spacers 15 to 20, facing towards the bottom surface 28 of shaped slab 10, are flush with said bottom surface 28. Height h of the spacers is smaller than that of shaped slabs 10. Spacers 15 to 20 have bevels 25 on the upper ends, with which said ends slope towards and merge into the respective side face 11 to 14 of the shaped slab.

Upper surface 27 of formed slabs 10 merges into side faces 11 to 14 via a rounding 26 extending all the way round. Said rounding 26 may alternatively be formed as a bevel. Bevels 25 of spacers 15 to 20 each end at a certain distance below roundings 26, so that after the joints are filled in, bevels 25 and therefore all of spacers 15 to 20 do not show.

Depending on how shaped slabs 10 are laid down relative to one another, said slabs 10 lie with their spacers abutting, so that joints 21 between spacer pairs 15, 16/17, 18 or 19, 20, i.e. the distances between confronting side walls 11, 12 and 13. 14 approximately correspond to the thickness d of two spacers. This type of paving is demonstrated in FIGS. 3, 4 and 5, 6. Alternatively, shaped slabs 10 can be layed such that spacers 15 to 20 interlock. In the shown exemplary embodiment, one spacer 19 or 20 always lies centrally between spacers 15, 16 or 17, 18 respectively, which are positioned near the ends of a respective side face 11 or 12. Joints 53 between side faces 11 to 14 of adjoining shaped slabs 10 and corners 24 this way approximately correspond to the thickness d of one spacer 15 to 20. Normally said joints 53 will be slightly bigger than thickness d, when the spacers 15 to 20 do not directly rest with their front faces against the confronting side faces 11 to 14 of adjoining shaped slabs 10. This type of paving is depicted in FIGS. 7 to 10.

Figures 5, 6:
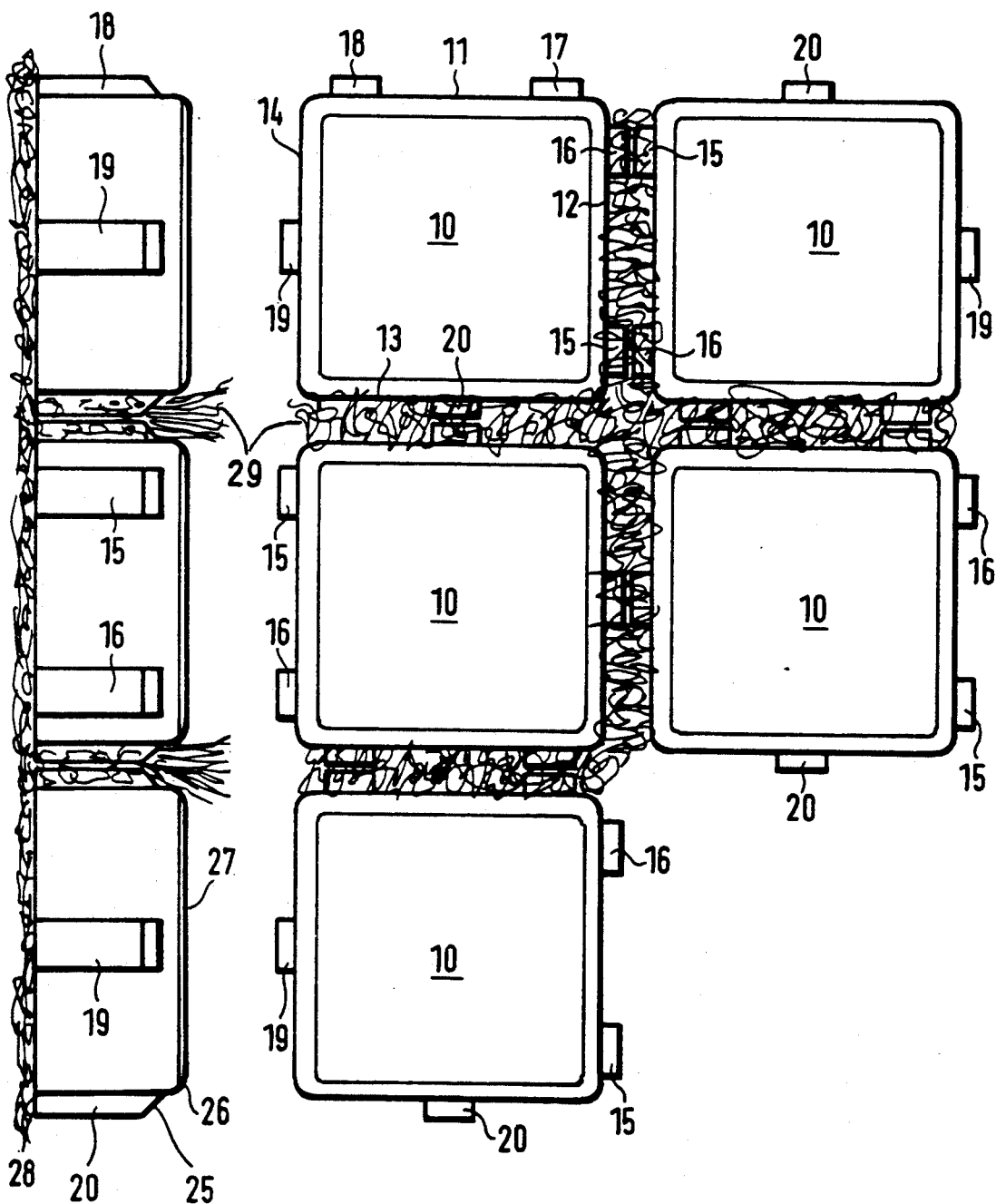
Figures 7, 8:
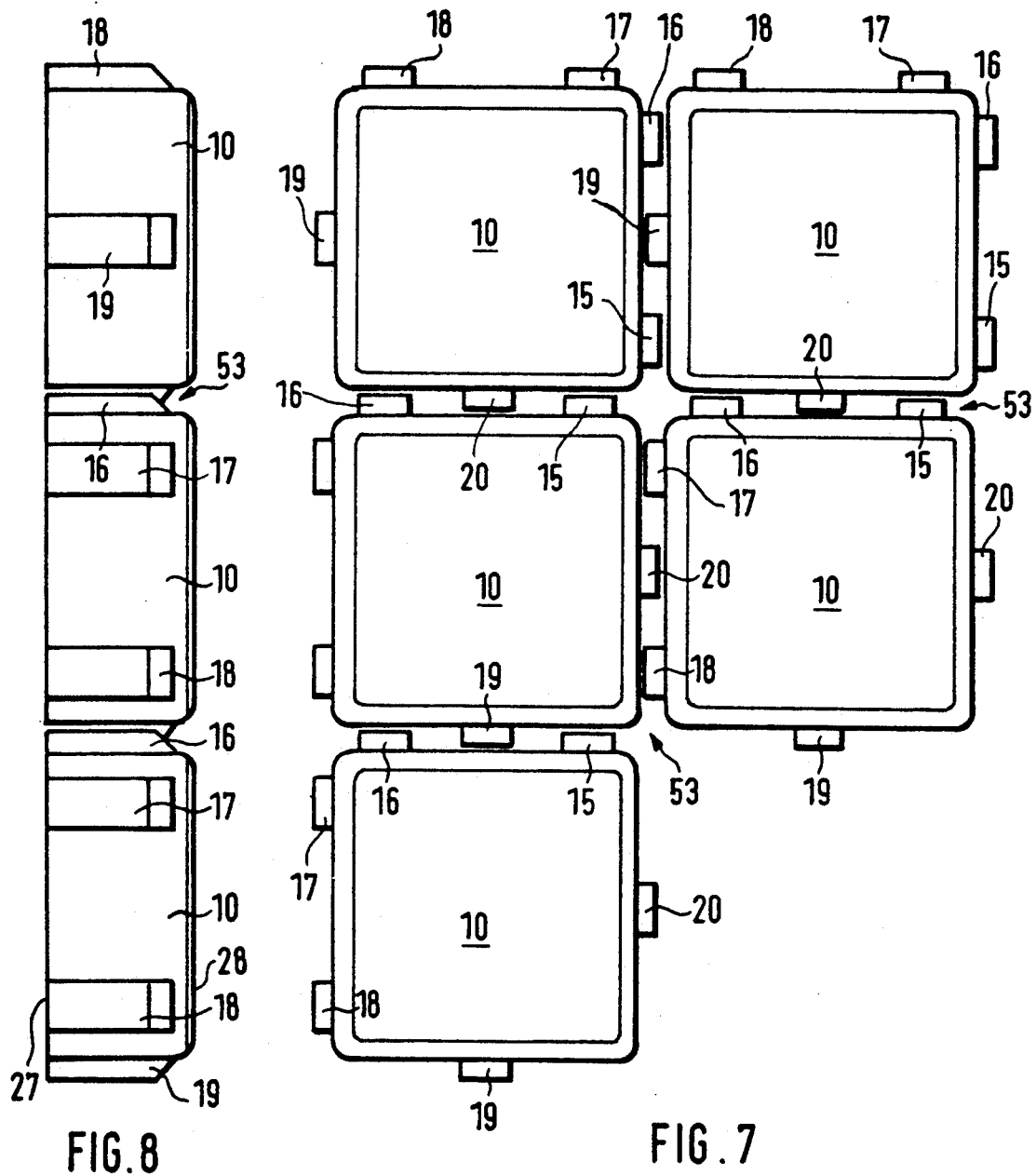

When joints 21, having particularly the double thickness 2d of spacers 15 to 20, are filled in with humus or the like and are growing grass, as shown in FIGS. 5 and 6, or when narrower joints 53 according to FIGS. 9 and 10 have merely been filled with sand, a visually uniform paving surface is formed, with the spacers 15 to 20 not showing any more, as they are covered by either sand 30 or grass 29 or humus or the like, because the height of said projections is smaller than that of the basic body of shaped slab 10.

Figure 11:
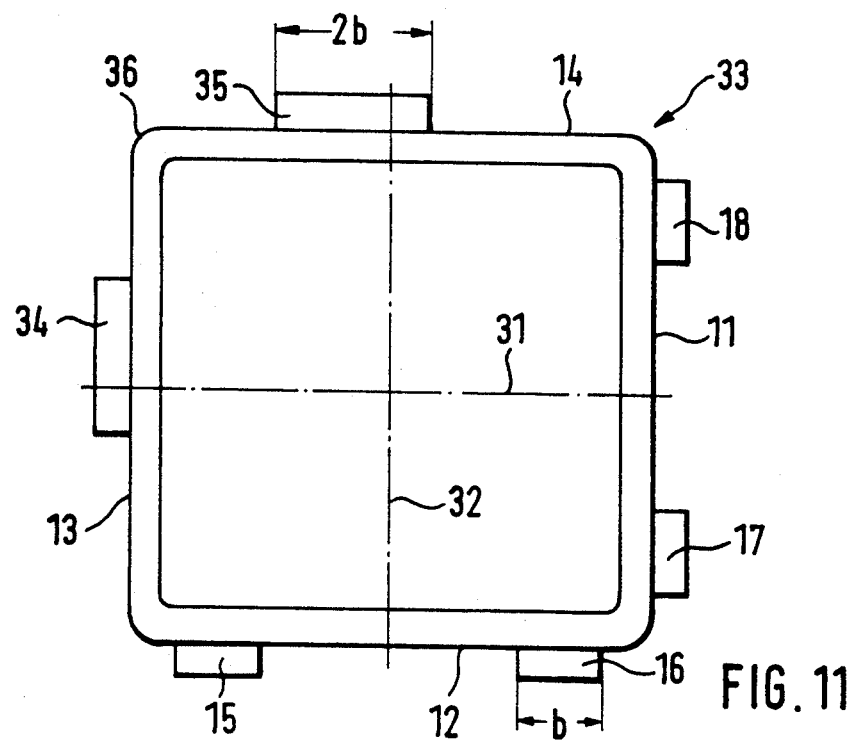
Figure 12:
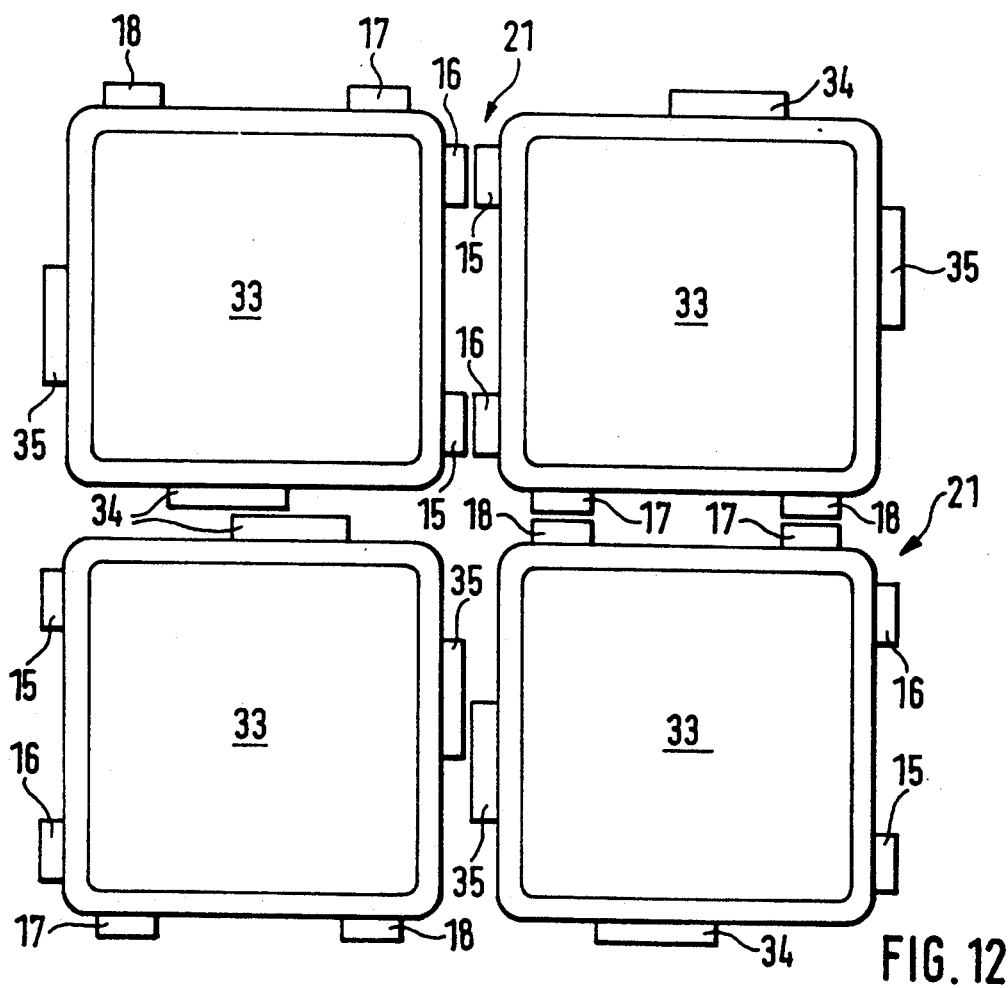
Figure 13:
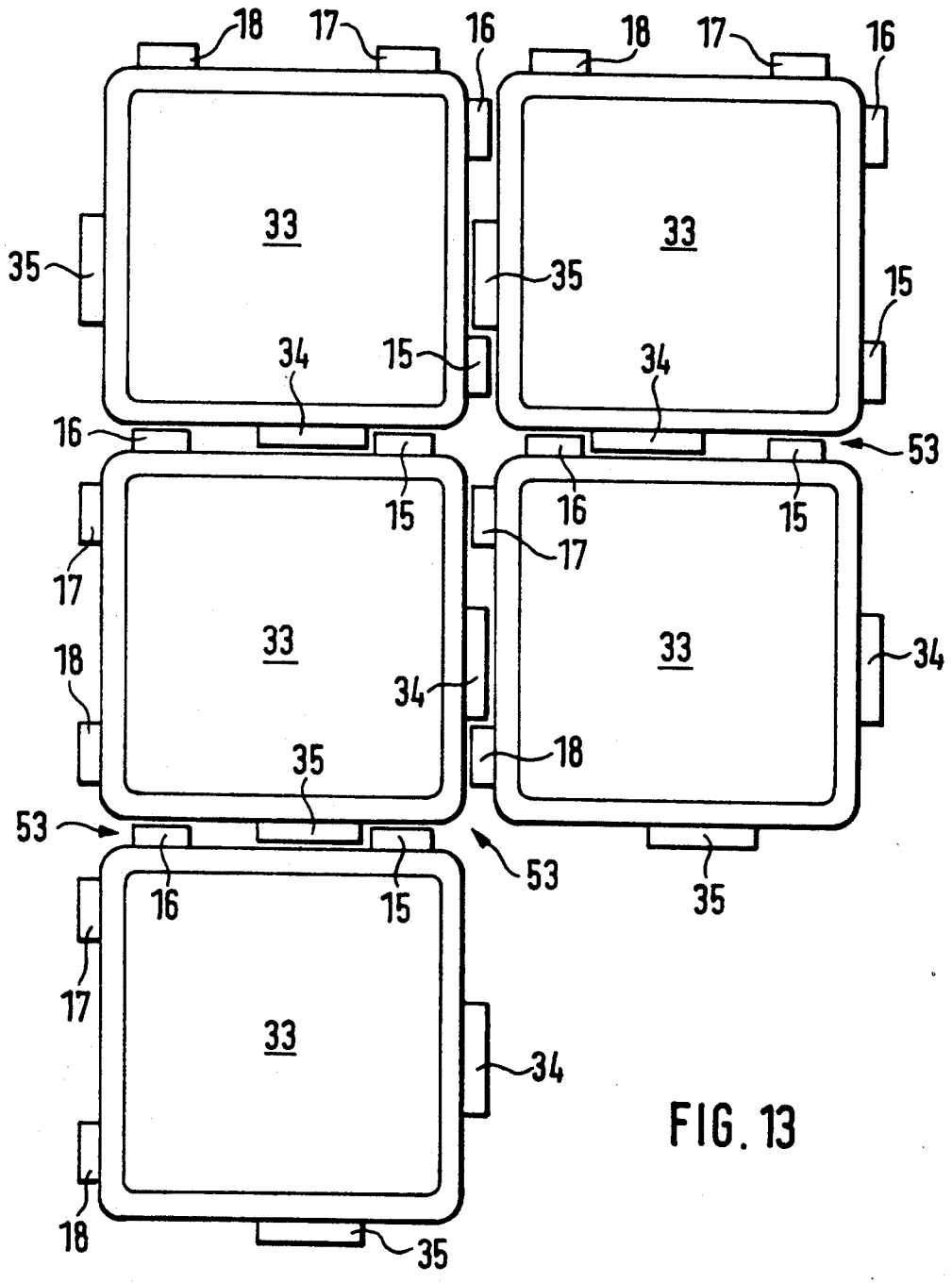

FIGS. 11 to 13 relate to an alternative exemplary embodiment of a shaped slab 33, which is different to the afore-described shaped slab 10 in that individual spacers 34 on side faces 13 and 14 are designed and arranged differently. Apart from that, shaped slab 33 and shaped slab 10 are alike. The same applies to the other exemplary embodiments of the invention described further down below, namely shaped slabs 37, 40 and 45.

The spacers 34, 35, singly assigned to side faces 13, 14 of shaped slab 33, are arranged asymmetrically relative to middle lines 31, 32, such that said middle lines 31, 32 are still running through spacers 34, 35 but are not bisecting them. In the shown embodiment, middle lines 31, 32 separate a quarter of the width 2b of spacers 34, 35, i.e. they are set off the middle by one quarter (cf. FIG. 11). Spacers 34, 35 are offset relative to one another in such a way that the bigger part of the width 2b of spacers 34, 35, namely two thirds of said width is pointing towards a right angle corner 36, formed by adjoining side faces 13, 14.

Spacers 34, 35 of shaped slab 33 are bigger in width than the other spacers 15 to 18 which are assigned in pairs to side faces 11, 12. In the shown embodiment, spacers 34, 35 are twice as wide as spacers 15 to 18, i.e. the former are of the width 2b and the latter of the width b. Alternatively, other ratios of the widths of spacers 34, 35 on the one hand and spacers 15 to 18 on the other are possible.

Figure 14:
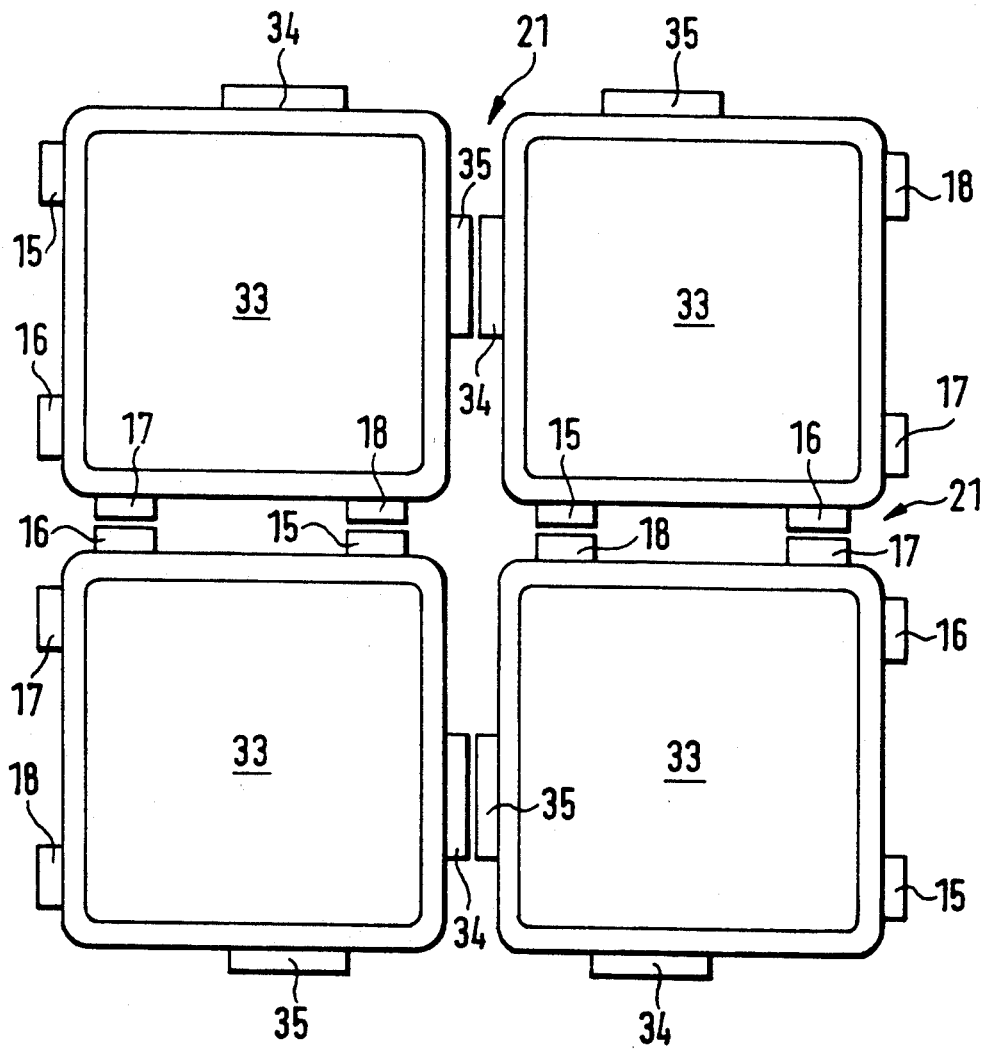
Figure 15:
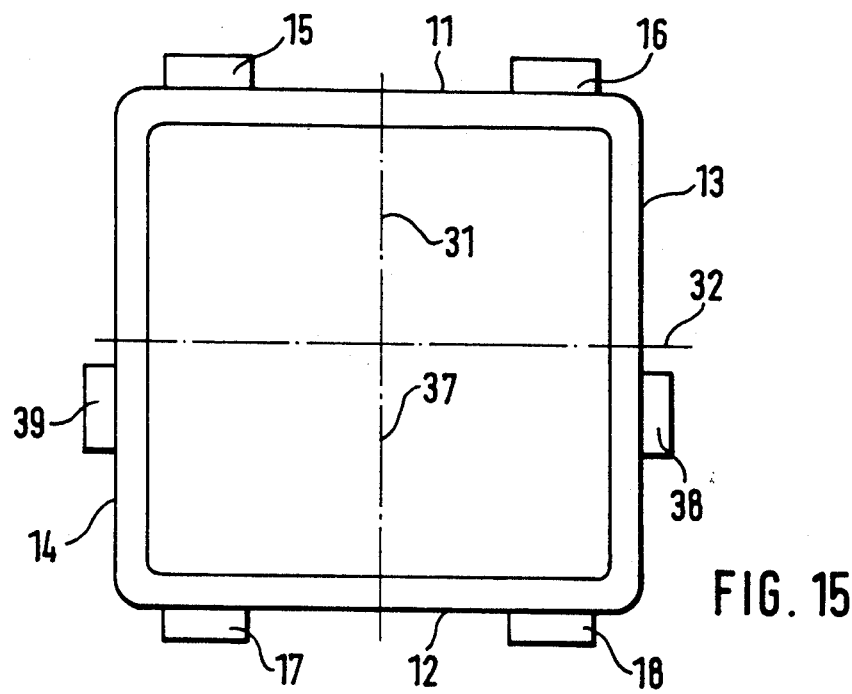

When shaped slabs 33 are layed such that spacers 15 to 18 and 34, 35 are in abutting position, forming a pavement with (twice as) wide joints 21, spacers 34, 35 are only partly abutting, due to their asymmetric arrangement, with one half of the width 2b of each spacer 34. 35 overlapping. This is clearly shown by FIG. 12. The other (normally wide) spacers 15 to 18 on the other hand abut each other with their near enough complete width b. Alternatively it would also be possible to arrange shaped slabs 33 so that their spacers abutt, but with a relative position different to the one shown in FIG. 12. With this alternative, the single double width spacers 34, 35 abutt one another completely, i.e. the complete (double) widths 2b rest against one another. In this case, the abutting surface of double width spacers 34, 35 corresponds to the abutting surface of the single width spacers 15 to 18. Hence, the abutting surfaces of individual side faces 11 to 14 of shaped slabs 33 are all of equal size, even though the side faces are provided with a different number of spacers 15 to 18 and 35, 36, thus evenly spreading the weight of the traffic in longitudinal and transverse direction of the paving (FIG. 14).

When shaped slabs 33 are layed so that spacers 15 to 18 and 34, 35 are interlocking, as shown in FIG. 13, single spacers 34 and 35 each come to lie between one pair of a spacers 15, 16 and 17, 18 respectively, so that relatively large abutting surfaces are formed between narrow joints 53 of shaped slabs 33, the paving then being suitable for carrying extra heavy traffic weights.

FIGS. 15 to 18 show a shaped slab 37, again having six spacers 15 to 18 and 38, 39, but all of equal width. Opposite side faces 11 and 12 are each provided with two spacers 15, 16 and 17, 18 respectively, said spacers being symmetrically positioned close to the ends of said side faces in accordance with the two aforedescribed embodiments. The other two opposite side faces 13 and 14 of shaped slab 37 are each provided with one single spacer 38, 39, said spacers 38, 39 being arranged asymmetrically relative to middle line 32 bisecting side faces 12 and 14, such that they are positioned a small distance away from middle line 32. Alternatively, spacers 38, 39 can also be positioned such that one of their side edges is lying on middle line 32. Spacers 38 and 39 are both set away off from the middle line towards the same side, so that they are both lying closer to transverse side face 12, which is connecting side faces 13 and 14. This is clearly shown by FIG. 15.

Figure 16:
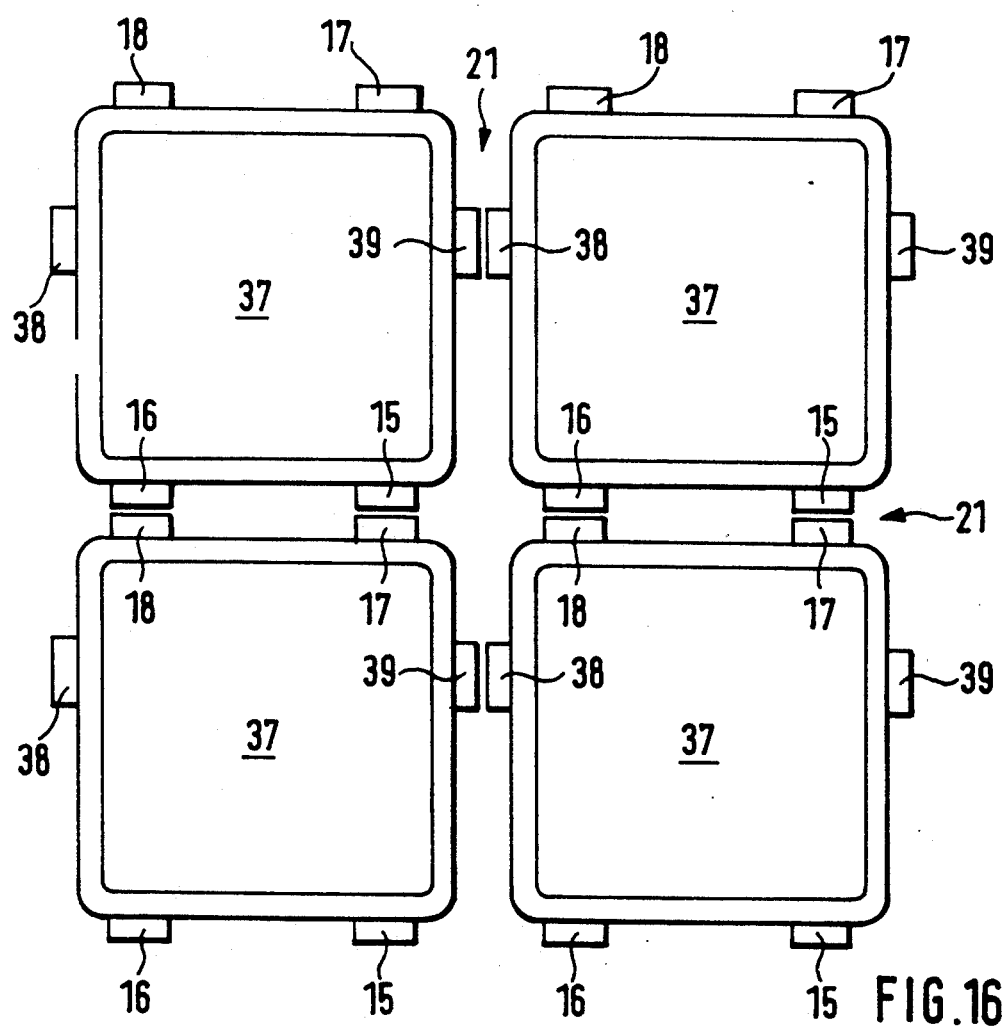

FIG. 16 depicts shaped slabs 37 being layed with abutting spacers 15 to 18 and 38, 39, such that joint 21 between adjacent shaped slabs 37 corresponds to the double width of spacers 15 to 18 or 38, 39. All spacers 15 to 18 and 38, 39 are in a position with their complete faces abutting.

Figure 17:
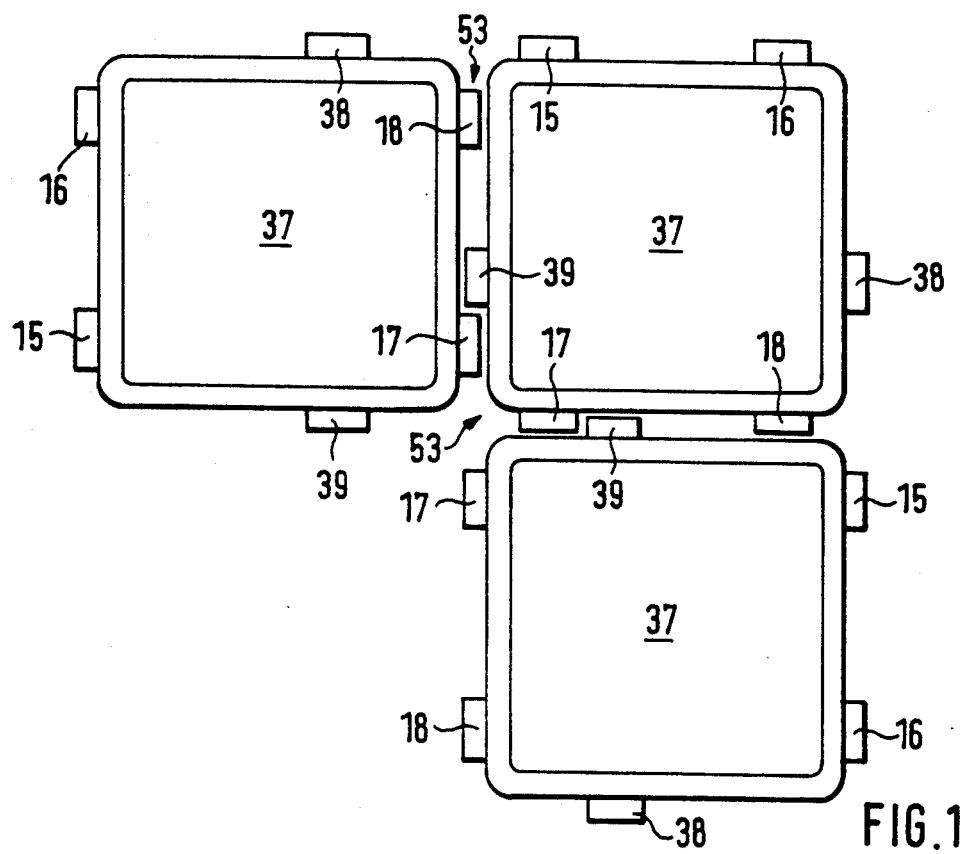

FIG. 17 shows a paving of shaped slabs 37 with all spacers 15 to 18 and 38. 39 being in complete interlocking position, so that joints 53 are of equal width in both, longitudinal and transverse direction of the paving, said width approximately corresponding to thickness d of one spacer 15 to 18 or 38, 39.

Figure 18:
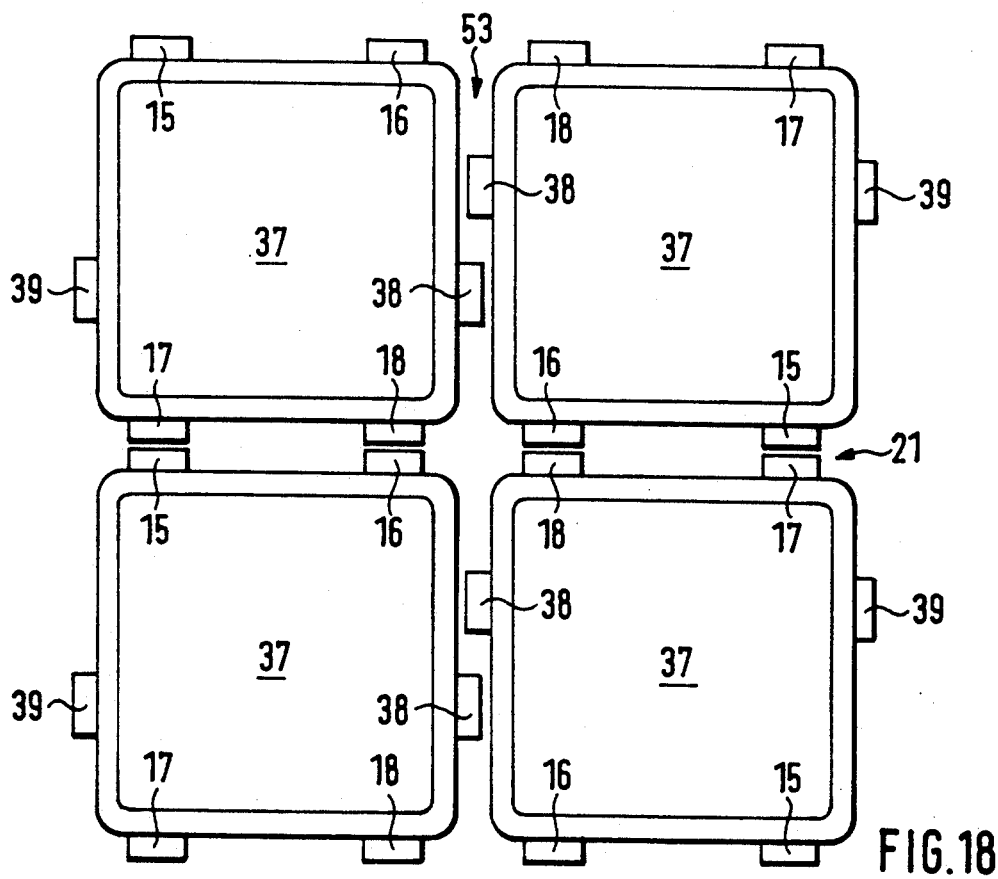

FIG. 18 shows an alternative way of laying the slabs, wherein only the single spacers 38, 39 are lying in interlocking position, thus forming a narrow joint 53 with a single width d of spacers 38, 39, whereas spacers 15 to 18, which are assigned in pairs to a respective side face 11 or 12, are in abutting position, completely overlapping one another for forming a wide joint 21 having approximately double width 2d of spacers 15 to 18. This way the spacers of the paving formed as shown by shaped slabs 37 are braced in longitudinal as well as in transverse direction such that pairs of spacers 15 to 18 rest against one another, whereas single spacers 38, 39 rest against respective side faces 13 or 14 of adjacent shaped slabs 37, so that the paving can receive in longitudinal as well as in transverse direction approximately equally large traffic weights. Besides, vegetations can be grown with different intensity or in one direction only grass 29 may be grown and in the other joints 53 may be just filled with sand, so that interesting visual effects may be achieved this way.

Figure 19:
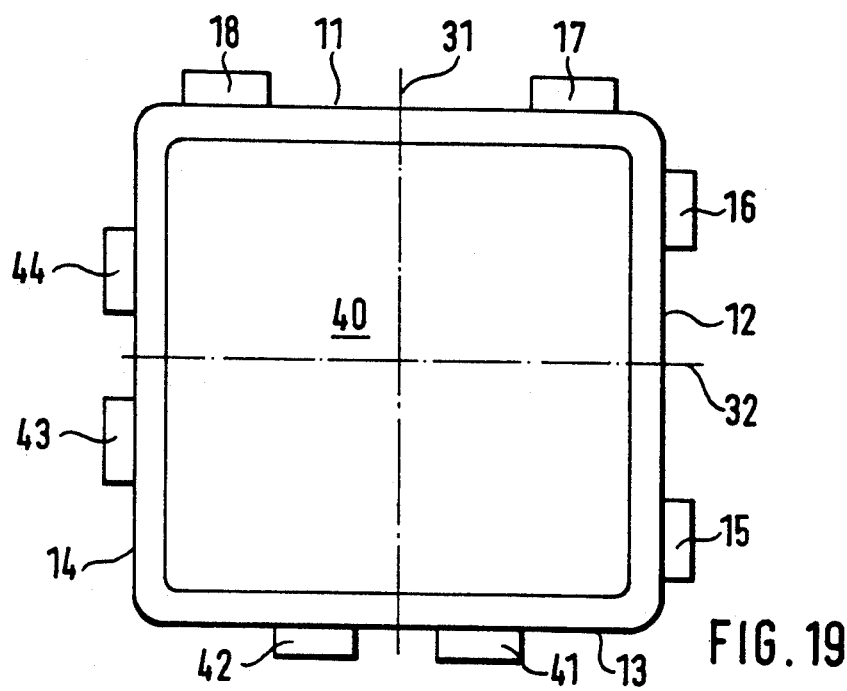
Figure 20:
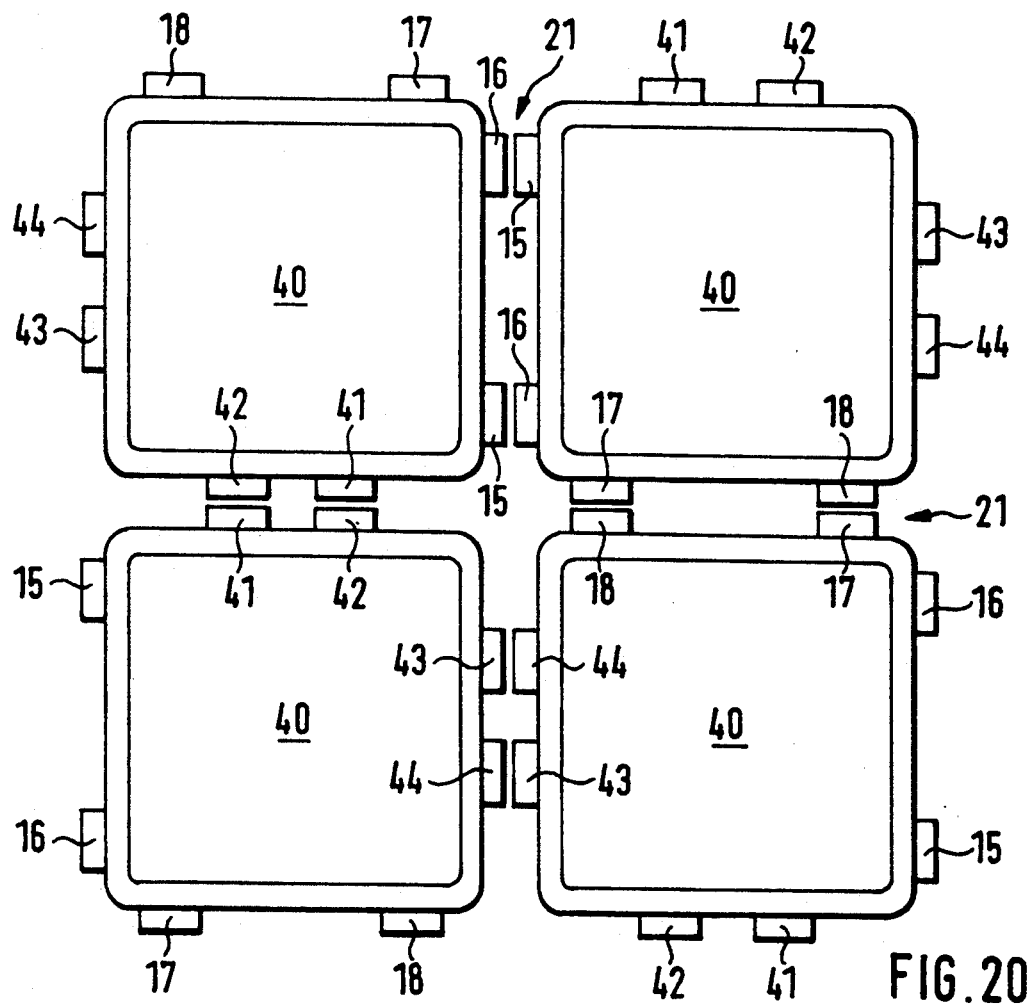
Figure 21:
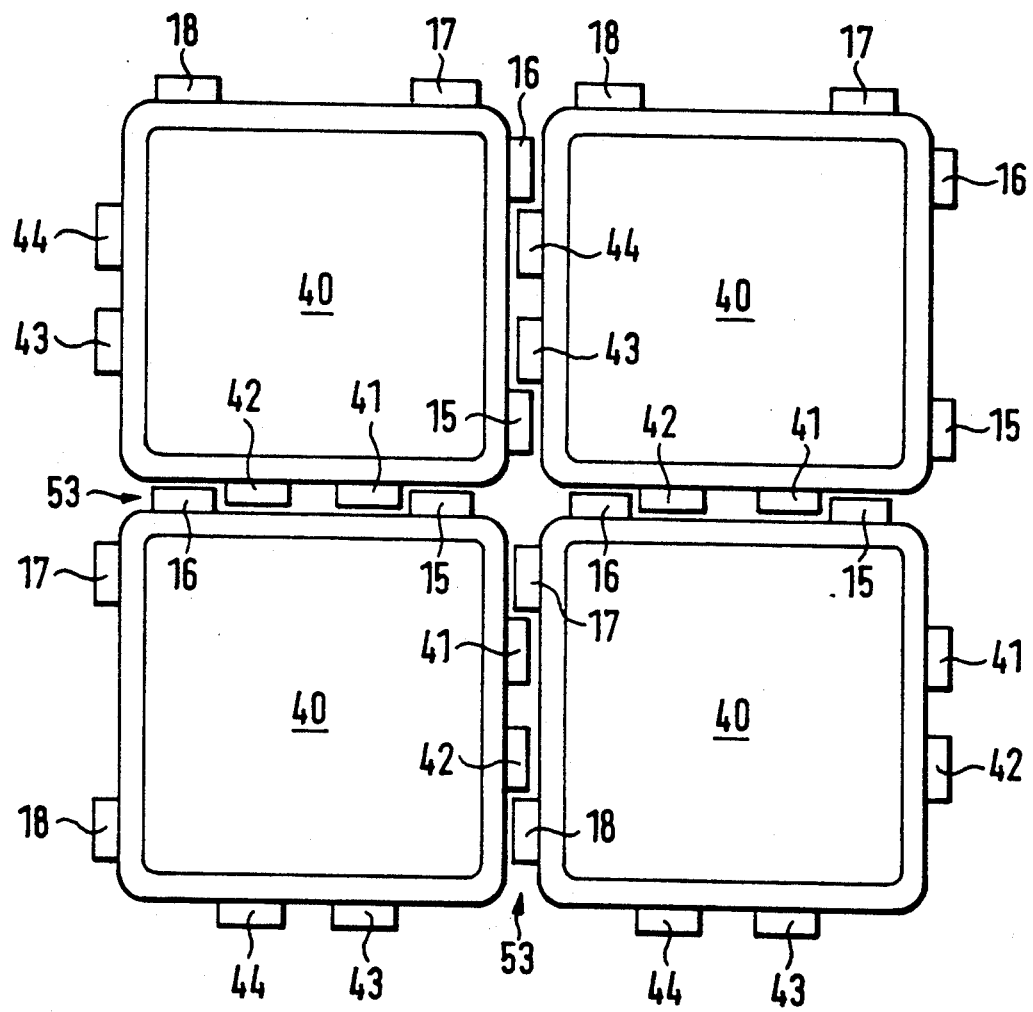
FIG. 21 a slab paving for forming narrow joints.

FIGS. 19 to 21 show a shaped slab 40 whith two outer a spacers 15, 16 and 17, 18 on adjoining, perpendicular side faces 11 and 12 respectively, said spacers being similarly designed and positioned as shaped slab 10 according to FIG. 1. The other two side faces 13 and 14 of shaped slab 40 also have two spacers 41 to 44 each, which are symmetric to middle lines 31, 32 and which are of the same dimensions as the other spacers 15 to 18. As can be seen in FIG. 19, the distance between spacers 41 to 44 assigned in pairs to side faces 13 and 14 is smaller than the one between spacers 15 to 18 on side faces 11, 12, such that the distance between two outer faces of spacers 41, 42 and 43, 44 is slightly smaller than the intermediate distance "a" between two oppositely situated side faces of spacers 15, 16 and 17, 18 respectively. This design guarantees that with an appropriate arrangement of shaped slabs 40 relative to one distance can lie between the two outer spacers 15 to 18, thus effecting an interlocking position for forming narrow gaps or joints 53 according to FIG. 21.

In order to form double width joints 21, shaped slabs 40 have to be layed relative to one another such that all spacers 15 to 18 and 41 to 44 are in flush abutting position (FIG. 20).

Figure 22:
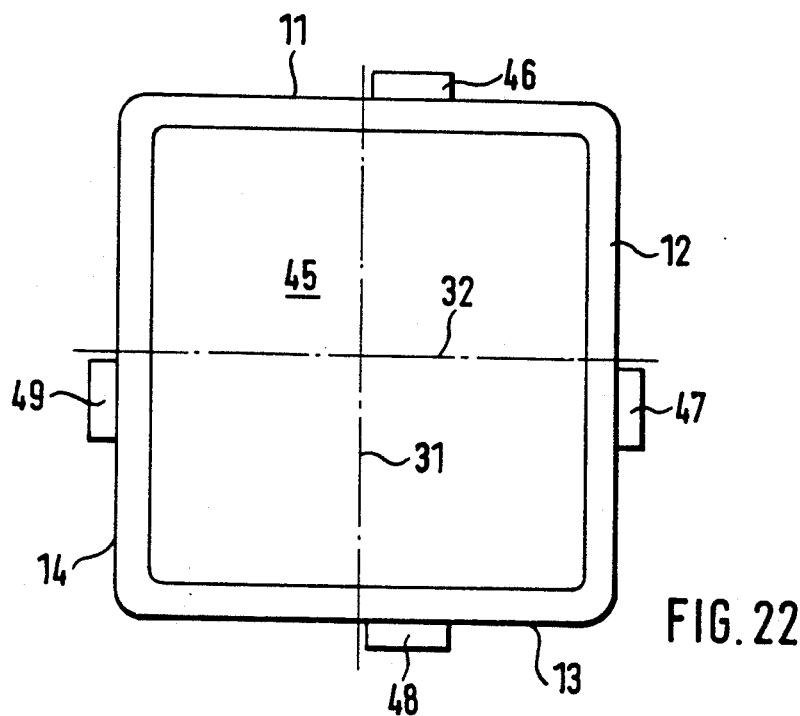
FIG. 22 a top plan view of a shaped slab (fifth exemplary embodiment)
Figure 23:
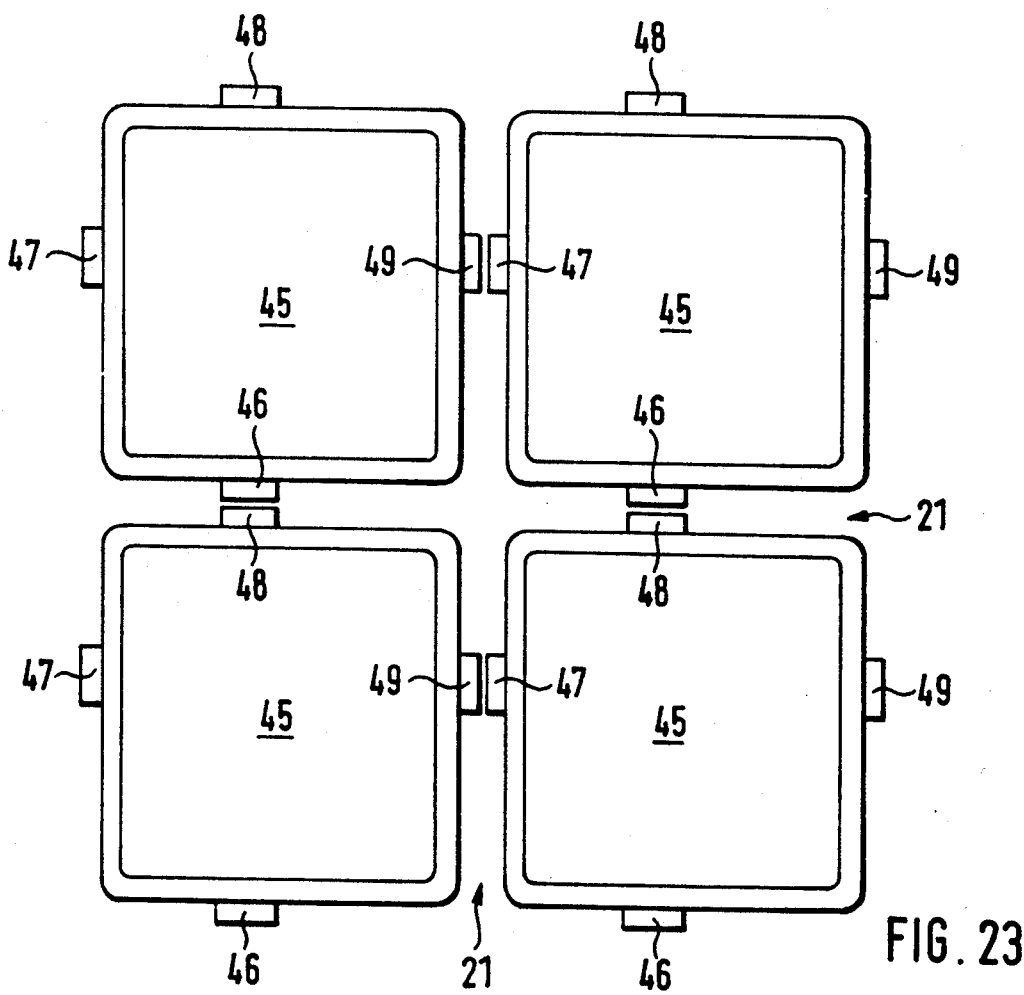
FIG. 23 a diagramatic representation of a slab paving for forming wide joints.
Figure 24:
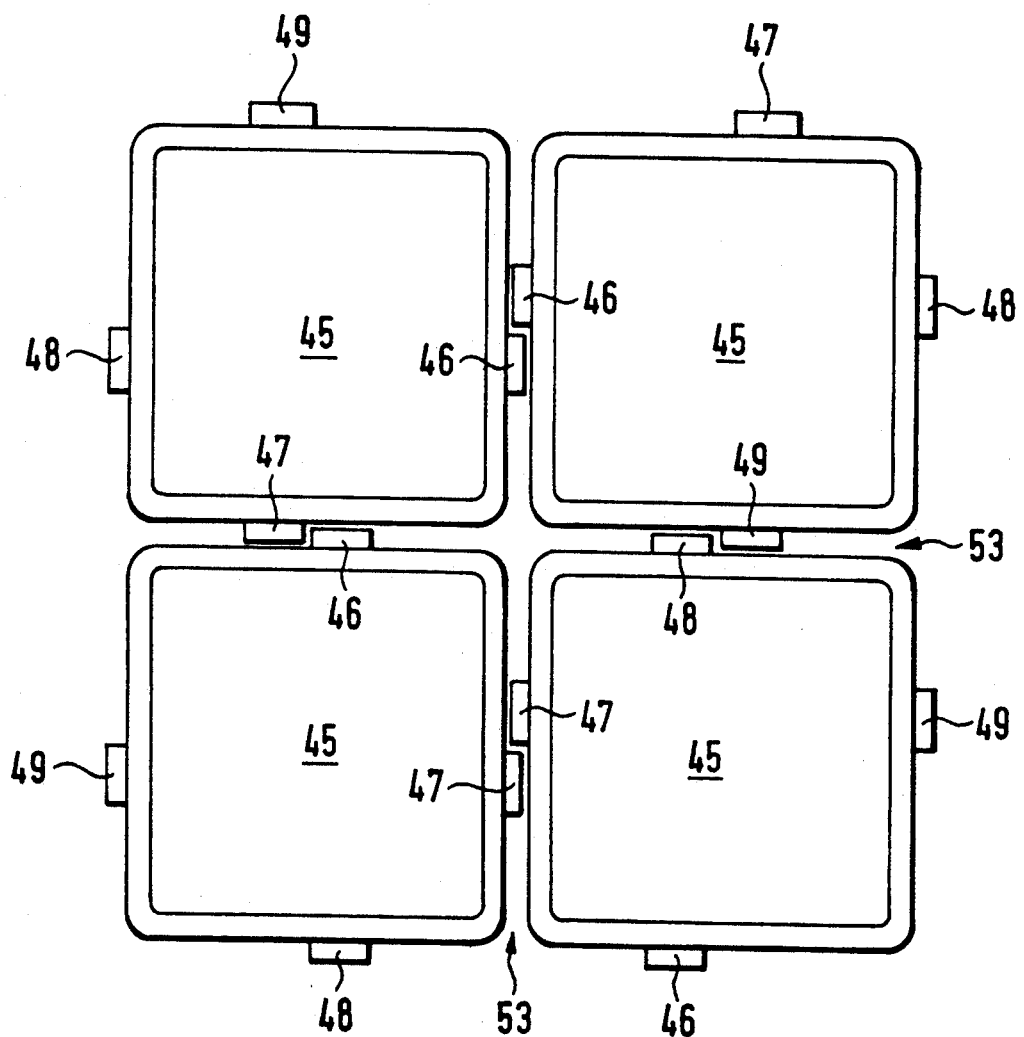
FIG. 24 a slab paving for forming narrow joints.

FIGS. 22 to 24 relate to a shaped slab 45 which only has four spacers 46 to 49, with one single spacer 46, 47 or 48, 49 being assigned to each side face 11 to 14. As shown by FIG. 22, all spacers 46 to 49 are arranged symmetrically to middle lines 31, 32 such that they are lying only a small distance away from said middle lines. Spacers 46, 48 and 47, 49 lying on oppositely situated side faces 11, 13 and 12, 14 respectively, are set off to the same side of the respective middle line 31, 32, so that two spacers 46, 48 or 47, 49 each are lying directly opposite one another.

With an appropriate relative positioning of shaped slabs 45, they can be layed forming double width joints 21, with spacers 46, 49 of adjacent shaped slabs 45 abutting one another along their complete surface (FIG. 23) or they can be layed for forming narrow joints 53, approximately having thickness d of one spacer 46 to 49 (FIG. 24). Compared to pavings formed by shaped slabs 10, 33, 37 or 40, the paving formed by shaped slabs 45 has the advantage that even when a paving with narrower joints 53 is laid, the free spaces between adjacent shaped slabs 45 are relatively big, due to single spacers 46 to 49 on side faces 11 to 14, ensuring a nearly continuous vegetation although the joints are of the narrow kind.

Figure 25:
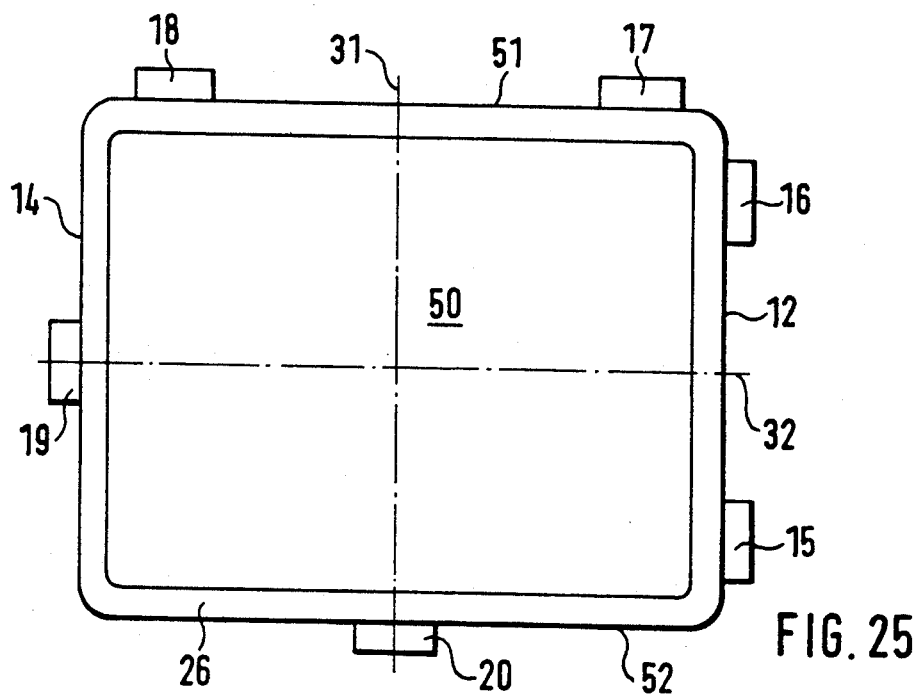
FIG. 25 a top plan view of a shaped slab with rectangular basic surfaces (sixth exemplary embodiment), FIG. 26 a diagramatic representation of a slab paving for forming wide joints, and FIG. 27 a slab paving for forming narrow joints.
Figure 26:
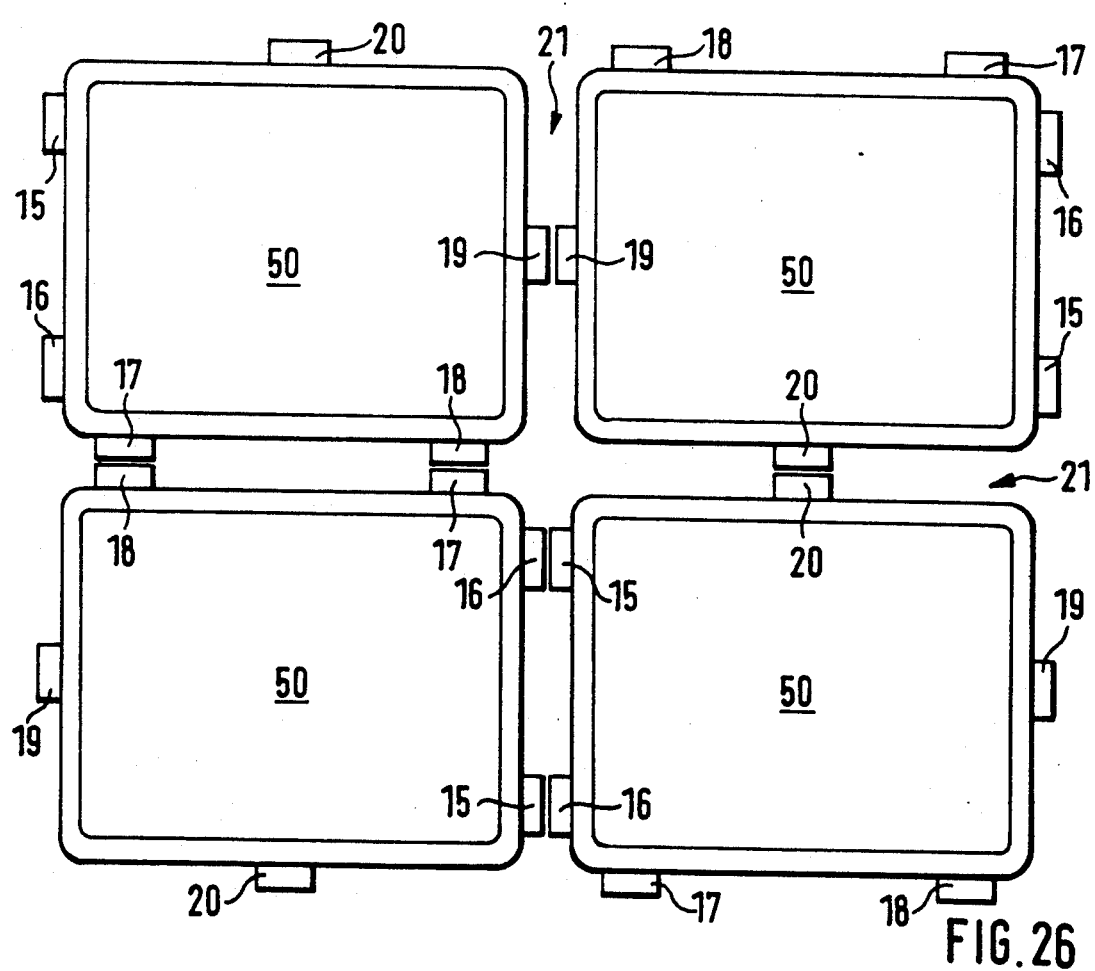
Figure 27:
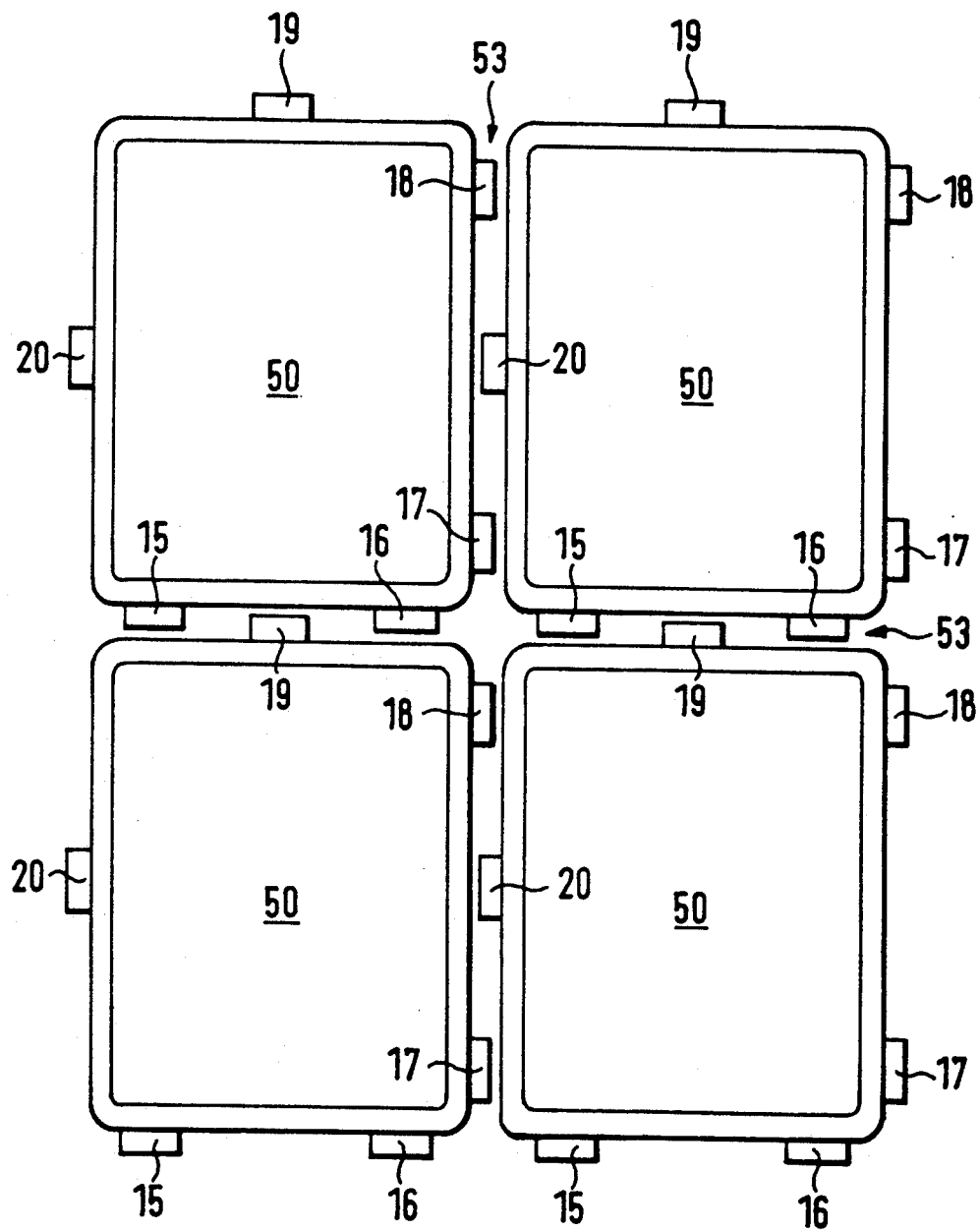

Finally, FIGS. 25 to 27 show a shaped slab with a rectangular basic surface, having two short side faces 12, 14 and two long side faces 51, 52. By analogy with shaped slab 10, shaped slab 50 has six spacers 15 to 20, which are arranged on side faces 11, 13 and 51, 52 according to the same basic geometric pattern used with shaped slab 10, i.e. symmetrically in middle lines 31, 32. Apart from that, shaped slab 50 corresponds to shaped slab 10 and shaped slab 33, 37, 40 and 45 as regards design. It would also be possible to arrange the spacers of shaped slab 50 according to the geometric pattern used with shaped slabs 33, 37, 40 and 45.

Several shaped slabs 50 can be arranged with their spacers 15 to 20 in abutting (FIG. 26) or in interlocking (FIG. 27) position, so that again joints 53 with single width d or joints 21 with double width 2d are formed.

Contrary to the aforedescribed rectangular and square basic surfaces, the shaped slabs can also be formed in accordance with the invention with polygonally, for example hexagonally shaped basic surfaces and respective spacers.

I claim:

1. Kit for making horizontal ground coverings and comprising a plurality of identically shaped rectangular slabs that are defined only by four longitudinal side faces which are only vertically straight and planar, and by top and bottom faces which are only planar; wherein:

all said side faces of each rectangular slab have outwardly projecting rib-like spacers which have a height that is only slightly less than that of the slab and which are spaced away from all four corners of the slab;

the spacers of first and second ones of said side faces are located only in first selected side face regions relative to a side face length;

the spacers of a third and fourth ones of said side faces are located only in second selected side face regions which are different from said first selected side face regions;

the location and longitudinal width of the spacers are such that, when said shaped slabs are laid down to make a ground covering, joints of only two different transverse widths are formed between adjacent shaped slabs;

each joint width depends on positions of corresponding side faces and corresponding spacers relative to adjacent slabs, and on whether said corresponding spacers abut one another to form wide joints or interleave with one another to form narrow joints between interleaving spacers;

in a single ground covering, all of said spacers either abut one another or interleave with each other; and all spacers (15 to 20; 34, 35; 38, 39; 41 to 44; 46 to 49) project out equally far from the side faces (11 to 14; 51, 52), so that the spacers all have approximately the same thickness (d).

2. Kit according to claim 1, wherein two side faces (11, 12, 51) are each provided with two spacers (15 to 18) which extend symmetrically relative to the respective middle lines (31, 32) close to respective corners (24) of the side faces (11, 12, 51).

3. Kit according to claim 2, wherein an intermediate distance (a) between the two spacers (15 to 18) lying close to the corners (24) of a side face is greater than said longitudinal width of a spacer such that, after the shaped slabs (33, 37, 40, 45) are laid with spacers which interleave with one another, draining joints are formed between the side faces (11 to 14) of the shaped slabs (33, 37, 40, 45).

4. Kit according to claim 3, wherein the shaped slabs are square concrete slabs.

5. Kit for making ground coverings and comprising a plurality of identically shaped rectangular slabs having longitudinal side faces; wherein:

all said side faces of each slab have outwardly projecting rib-like spacers of a height which is shorter than that of said shaped slabs;

the spacers of first and second ones of said side faces are located only in first selected side face regions relative to a side face length;

the spacers of a third and fourth ones of said side faces are located only in second selected side face regions which are different from said first selected side face regions;

the location and longitudinal width of the spacers are such that, when said shaped slabs are laid down to make a ground covering, joints of only two different transverse widths are formed between adjacent shaped slabs;

each joint width depends on positions of corresponding side faces and corresponding spacers relative to adjacent slabs, and on whether said corresponding spacers abut one another or interleave with one another;

in a single ground covering, all of said spacers either abut one another or interleave with each other;

the number of said spacers on said first and second side faces is even, and the number of said spacers on said third and fourth side faces is odd;

wherein said even number is 2, and said odd number is 1 so that said third and fourth side faces have only single spacers;

the single spacers are arranged asymmetrically relative to middle lines bisecting the side faces; and the single spacers (34, 35) lie off-center on the middle lines (31, 32) of the respective side faces (13, 14), with a mismatch of less than half the longitudinal width of the respective spacers (34, 35).

6. Kit for making ground coverings and comprising a plurality of identically shaped rectangular slabs having longitudinally side faces wherein:

all said side faces have outwardly projecting spacers of a height which is shorter than that of said shaped slabs;

the spacers of first and second ones of said side faces are located only in first selected side face regions relative to a side face length;

the spacers of a third and fourth ones of said side faces are located only in second selected side face regions which are different from said first selected side face regions;

the location and longitudinal width of the spacers are such that, when said shaped slabs are laid down in touching relationship to make a ground covering, joints of different widths are formed between adjacent shaped slabs;

each joint width depends on positions of corresponding side faces and corresponding spacers relative to adjacent slabs, and on whether said corresponding spacers abut one another or directly rest against the side faces of the adjacent slabs;

wherein the number of said spacers on said first and second side faces is even, and the number of said spacers on said third and fourth side faces is odd;

wherein said even number is 2, and said odd number is 1 so that said third and fourth side faces have only single spacers;

wherein the single spacers are arranged asymmetrically relative to middle lines bisecting the side faces;

wherein the single spacers lie off-center of the middle lines (31, 32) of the respective side faces (13, 14), with a mismatch of less than half the longitudinal width of the respective spacers (34, 35); and the longitudinal width of the single spacers (34, 35) is greater than the longitudinal width (b) of the other spacers (15 to 18).

7. Kit according to claim 6, wherein the single spacers (34, 35) are arranged on two adjoining side faces and are set off-center relative to the middle-lines (31, 32) towards a corner (36) formed between the two respective side faces (13, 14).

8. Kit for making ground coverings and comprising a plurality of identically shaped rectangular slabs having longitudinal side faces; wherein:

all said side faces of each slab have outwardly projecting rib-like spacers of a height which is shorter than that of said shaped slabs;

the spacers of first and second ones of said side faces are located only in first selected side face regions relative to a side face length;

the spacers of a third and fourth ones of said side faces are located only in second selected side face regions which are different from said first selected side face regions;

the location and longitudinal width of the spacers are such that, when said shaped slabs are laid down to make a ground covering, joints of only two different transverse widths are formed between adjacent shaped slabs;

each joint width depends on positions of corresponding side faces and corresponding spacers relative to adjacent slabs, and on whether said corresponding spacers abut one another or interleave with one another;

in a single ground covering, all of said spacers either abut one another or interleave with each other;

the number of said spacers on said first and second side faces is even, and the number of said spacers on said third and fourth side faces is odd;

wherein the single spacers are arranged asymmetrically relative to middle lines bisecting the side faces; and the single spacers (38, 39; 46 to 49) are set off center to the side next to the middle lines (31, 32) of the respective side faces (11 to 14).

9. Kit according to claim 8, wherein those single spacers (38, 39; 46 to 49), which are singly arranged asymmetrically relative to the middle lines on opposite side faces (11 to 14), lie on the same side of the middle line, from which they are set off-center.

10. Kit for making horizontal ground coverings and comprising a plurality of identically shaped rectangular slabs that are defined only by four longitudinal side faces which are only vertically straight and planar, and by top and bottom faces which are only planar; wherein:

all said side faces of each rectangular slab have outwardly projecting rib-like spacers which have a height that is only slightly less than that of the slab and which are spaced away from all four corners of the slab;

the spacers of first and second ones of said side faces are located only in first selected side face regions relative to a side face length;

the spacers of a third and fourth ones of said side faces are located only in second selected side face regions which are different from said first selected side face regions;

the location and longitudinal width of the spacers are such that, when said shaped slabs are laid down to make a ground covering, joints of only two different transverse widths are formed between adjacent shaped slabs;

each joint width depends on positions of corresponding side faces and corresponding spacers relative to adjacent slabs, and on whether said corresponding spacers abut one another to form wide joints or interleave with one another to form narrow joints between interleaving spacers; and in a single ground covering, all of said spacers either abut one another or interleave with each other; and all spacers (15 to 20; 34, 35; 38, 39; 41 to 44; 46 to 49) project out equally far from the side faces (11 to 14; 51, 52), so that the spacers all have approximately the same thickness (d).

11. Kit for making horizontal ground coverings and comprising a plurality of identically shaped rectangular slabs that are defined only by four longitudinal side faces which are only vertically straight and planar, and by top and bottom faces which are only planar; wherein:

all said side faces of each rectangular slab have outwardly projecting rib-like spacers which have a height that is only slightly less than that of the slab and which are spaced away from all four corners of the slab;

the spacers of first and second ones of said side faces are located only in first selected side face regions relative to a side face length;

the spacers of a third and fourth ones of said side faces are located only in second selected side face regions which are different from said first selected side face regions;

the location and longitudinal width of the spacers are such that, when said shaped slabs are laid down to make a ground covering, joints of only two different transverse widths are formed between adjacent shaped slabs;

each joint width depends on positions of corresponding side faces and corresponding spacers relative to adjacent slabs, and on whether said corresponding spacers abut one another or interleave with one another to form narrow joints between interleaving spacers; and in a single ground covering, all of said spacers either abut one another or interleave with each other; and a bottom surface of said spacers is flush with a bottom surface (28) of the shaped slabs.

12. Kit according to claim 11, wherein the upper ends of the spacers (15 to 20; 34, 35; 38, 39; 41 to 44; 46 to 49) are beveled and slope upwardly towards the side faces (11 to 14; 51, 52) of the shaped slabs.

13. Kit according to claim 12, wherein upper edges of the shaped slabs (10, 33, 37, 40, 45, 50) are rounded off (rounding 26).

14. Kit for making horizontal ground coverings and comprising a plurality of identically shaped rectangular slabs that are defined only by four longitudinal side faces which are only vertically straight and planar, and by top and bottom faces which are only planar; wherein:

all said side faces of each rectangular slab have outwardly projecting rib-like spacers which have a height that is only slightly less than that of the slab and which are spaced away from all four corners of the slab;

the spacers of first and second ones of said side faces are located only in first selected side face regions relative to a side face length;

the spacers of a third and fourth ones of said side faces are located only in second selected side face regions which are different from said first selected side face regions;

the location and longitudinal width of the spacers are such that, when said shaped slabs are laid down to make a ground covering, joints of only two different transverse widths are formed between adjacent shaped slabs;

each joint width depends on positions of corresponding side faces and corresponding spacers relative to adjacent slabs, and on whether said corresponding spacers abut one another to form wide joints or interleave with one another to form narrow joints between interleaving spacers; and in a single ground covering, all of said spacers either abut one another or interleave with each other; and the shaped slabs are square.

15. Kit for making horizontal ground coverings and comprising a plurality of identically shaped rectangular slabs that are defined only by four longitudinal side faces which are only vertically straight and planar, and by top and bottom faces which are only planar; wherein:

all said side faces of each rectangular slab have outwardly projecting rib-like spacers which have a height that is only slightly less than that of the slab and which are spaced away from all four corners of the slab;

the spacers of first and second ones of said side faces are located only in first selected side face regions relative to a side face length;

the spacers of a third and fourth ones of said side faces are located only in second selected side face regions which are different from said first selected side face regions;

the location and longitudinal width of the spacers are such that, when said shaped slabs are laid down to make a ground covering, joints of only two different transverse widths are formed between adjacent shaped slabs;

each joint width depends on positions of corresponding side faces and corresponding spacers relative to adjacent slabs, and on whether said corresponding spacers abut one another to form wide joints or interleave with one another to form narrow joints between interleaving spacers; and in a single ground covering, all of said spacers either abut one another or interleave with each other; and the number of said spacers on said first and second side faces is even, and the number of said spacers on said third and fourth side faces is odd.

16. Kit according to claim 15, wherein said even number is 2, and said odd number is 1 so that said third and fourth side faces have only single spacers.

17. Kit according to claim 16, wherein the single spacers are arranged asymmetrically relative to middle lines bisecting the side faces.

18. Kit for making horizontal ground coverings and comprising a plurality of identically shaped rectangular slabs that are defined only by four longitudinal side faces which are only vertically straight and planar, and by top and bottom faces which are only planar; wherein:

all said side faces of each slab have outwardly projecting rib-like spacers which have a height that is only slightly less than that of the slab and which are spaced away from all four corners of the slab;

the spacers of first and second ones of said side faces are located only in first selected side face regions relative to a side face length;

the spacers of a third and fourth ones of said side faces are located only in second selected side face regions which are different from said first selected side face regions;

the location and longitudinal width of the spacers are such that, when said shaped slabs are laid down to make a ground covering, joints of only two different transverse widths are formed between adjacent shaped slabs;

each joint width depends on positions of corresponding side faces and corresponding spacers relative to adjacent slabs, and on whether said corresponding spacers abut one another or interleave with one another;

in a single ground covering, all of said spacers either abut one another or interleave with each other; and all of said side faces have the same number of said spacers.

19. Kit according to claim 18, wherein said number is 2.

20. Kit according to claim 18, wherein said number is 1.

21. In a kit for making horizontal ground coverings and comprising a plurality of identically shaped rectangular paving slabs that are defined only by four side faces which are only vertically straight and planar, and by top and bottom faces which are only planar, the improvement wherein:

all of said side faces (11 ... 14) of each shaped rectangular slab (10) have rib-like vertically-extending spacers (15 ... 20; 38, 39; 41 ... 44; 46 ... 49), which are spaced from all four corners of said each shaped rectangular slab, for forming joints between adjacent shaped slabs;

all the spacers have a height which is only slightly less than that of the slabs;

all the spacers have approximately the same thickness which forms a depth of spacers relative to the side faces so that all spacers outwardly project from the side faces at distances that are substantially identical;

a first two of said side faces of each shaped slab are formed correspondingly as regards number and relative position of the spacers, and are formed differently from the other two of said side faces;

the other two of said side faces also are formed correspondingly relative to one another as regards number and/or relative position of the spacers;

relative position, number and width of the spacers being such that said spacers of said differently formed side faces of adjacent shaped slabs, when laid in touching relationship, directly abut a side face of an adjacent slab and do not overlap, thereby forming narrow joints between adjacent slabs when such differently formed side faces confront one another, but such that that spacers of correspondingly formed confronting side faces of adjacent shaped slabs at least partially overlap and abut one another to form wide joints between adjacent slabs;

said spacers are arranged such that, within a single ground covering, only correspondingly formed side faces confront one another (21) to form said wide joints, or only differently formed side faces (53) confront one another to form said narrow joints; and (a) spacer widths and (b) distance between two spacers on the same side face are such that, in a paving, spacer-free passages are formed in said narrow joints.

22. The kit according to claim 21, wherein:
said first two side faces of each slab are adjoining and have only two spaced-apart spacers each; and
said other two side faces are adjoining, and each has only a single spacer located in the center of its side face.

23. The kit according to claim 22, wherein said two spacers of each of said first two side faces are arranged symmetrically relative to a middle line (31, 32) bisecting the respective side face.

24. The kit according to claim 23, wherein all spacers have the same dimensions.

25. The kit according to claim 21, wherein said first two side faces of each slab have only two spaced-apart spacers each.

26. The kit according to claim 21, wherein:
said first two side faces of each slab are adjoining and have only two spaced-apart spacers each; and
said other two side faces are adjoining.

27. The kit according to claim 21, wherein:
said first two side faces of each slab are adjoining; and
said other two side faces are adjoining and have only a single spacer each.

28. Kit for making horizontal ground coverings and comprising a plurality of identically shaped rectangular slabs that are defined only by four longitudinal side faces which are only vertically straight and planar, and by top and bottom faces which are only planar; wherein:

all said side faces of each rectangular slab have outwardly projecting rib-like spacers which have a height that is only slightly less than that of the slab and which are spaced away from all four corners of the slab;

a first two of said side faces of each slab adjoin one another (11, 12; 13, 14 and are formed correspondingly as regards number and relative position of the spacers, and are formed differently from the other two of said side faces;

said first two side faces (11, 12) have only two spaced apart spacers (15, 16; 17, 18) each; and the other two side faces (13, 14) adjoin and have only a single spacer each, the width of said single spacer being smaller than the distance between said two spaced apart spacers (15, 16; 17, 18) of each of said first two side faces (11, 12).

29. In a kit for making ground coverings and comprising a plurality of identically shaped rectangular slabs having four side faces, the improvement wherein:
all of said side faces (11 . . . 14) of a shaped slab (10) have spacers (15 . . . 20; 38, 39; 41 . . . 44; 46 . . . 49) for forming joints between adjacent shaped slabs when laid in touching relationship;
a first two of said side faces of each slab which adjoin one another (11, 12; 13, 14) are formed correspondingly as regards number and relative position of the spacers, and are formed differently from the other two of said side faces;
said first two of the correspondingly formed side faces (11, 12) have two spaced apart spacers (15, 16; 17, 18) each; and
the other two side faces (13, 14) have two spacers (41, 42; 43, 44) each which are arranged at equal distances from imaginary midplanes (31, 32) and whose outer distances from one another are smaller than the distances between the spacers (15, 16; 17, 18) of the first two side faces (11, 12).

30. In a kit for making ground coverings and comprising a plurality of identically shaped rectangular slabs having four side faces, the improvement wherein:
all of said side faces (11 . . . 14) of a shaped slab (10) have rib-like spacers (15 . . . 20; 38, 39; 41 . . . 44; 46 . . . 49) for forming joints between adjacent shaped slabs;
a first two of said side faces of each slab which adjoin one another (11, 12; 13, 14) are formed correspondingly as regards number and relative position of the spacers, and are formed differently from the other two of said side faces;
said first two of the correspondingly formed side faces (11, 12) have two spaced apart spacers (15, 16; 17, 18) each; and
the other two adjoining side faces (13, 14) have a single spacer each, the width of said single spacer being smaller than the distance between said two spaced apart spacers (15, 16; 17, 18) of each of said first two side faces (11, 12); and
the single spacers (34, 35) are arranged offset relative to imaginary midplanes (31, 32) of the shaped slab (10), such that the single spacers (34, 35) extend on both sides of the midplanes (31, 32), the width and relative position of the single spacers being defined such that one single spacer (34, 35) is received between two spaced apart spacers (15, 16 or 17, 18) when the respective side faces of adjacent shaped slabs confront one another.

31. In a kit for making ground coverings and comprising a plurality of identical shaped rectangular slabs having four side faces, the improvement wherein:
all of said side faces (11 . . . 14) of a shaped slab (10) have spacers (15 . . . 20; 38, 39; 41 . . . 44; 46 . . . 49) for forming joints between adjacent shaped slabs when laid in touching relationship;
a first two of said side faces of each shaped slab are formed correspondingly as regards number and relative position of the spacers, and are formed differently from the other two of said side faces;
two oppositely situated side faces (11, 12) are provided with two spaced apart spacers (15, 16 and 17, 18) each; and
the other two side faces (13, 14) are provided with one spacer (38, 39) each, said spacer being arranged at a distance to a common midplane (32) of the two side faces (13, 14) and on the same side of said midplane (32), such that the single spacer (38, 39) enters the region between two spacers (15, 16 or 17, 18) of the side faces (11, 12) when the respective side faces (11, 12) of adjacent shaped slabs confront one another.

32. In a kit for making ground coverings and comprising a plurality of identically shaped rectangular slabs having four side faces, the improvement wherein:

all of said side faces (11 ... 14) of a shaped slab (10) have spacers (15 ... 20; 38, 39; 41 ... 44; 46 ... 49) for forming joints between adjacent shaped slabs when laid in touching relationship;

a first two of said side faces of each shaped slab are formed correspondingly as regards number and relative position of the spacers, and are formed differently from the other two of said side faces;

each side face (11 ... 14) is provided with a single spacer (46, 47, 48, 49);

all spacers are arranged offset and at a distance from midplanes (31, 32); and spacers (46, 48 and 47, 49) of oppositely situated side faces (11, 13 and 12, 14) are each arranged on the same side of an associated midplane (31, 32).

* * * * *